US011659548B2

(12) United States Patent
Khoshnevisan et al.

(10) Patent No.: US 11,659,548 B2
(45) Date of Patent: May 23, 2023

(54) SEPARATE FEEDBACK FOR SEMI-PERSISTENT SCHEDULING DOWNLINK WIRELESS COMMUNICATIONS

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US); Tao Luo, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/314,984

(22) Filed: May 7, 2021

(65) Prior Publication Data

US 2022/0361208 A1 Nov. 10, 2022

(51) Int. Cl.
*H04W 72/1273* (2023.01)
*H04W 72/02* (2009.01)
(Continued)

(52) U.S. Cl.
CPC ....... *H04W 72/1273* (2013.01); *H04W 72/02* (2013.01); *H04W 72/0446* (2013.01); *H04W 72/10* (2013.01); *H04W 72/1257* (2013.01)

(58) Field of Classification Search
CPC ............. H04W 72/02; H04W 72/0453; H04W 72/0446; H04W 72/10; H04W 72/06; H04W 72/1257
See application file for complete search history.

(56) References Cited

U.S. PATENT DOCUMENTS

| 2019/0261361 A1* | 8/2019 | Xiong ................... H04W 72/02 |
| 2021/0014026 A1 | 1/2021 | Papasakellariou |

(Continued)

FOREIGN PATENT DOCUMENTS

| WO | WO-2020069468 A1 | 4/2020 |
| WO | WO-2020264450 A1 | 12/2020 |

OTHER PUBLICATIONS

3GPP TSG RAN WGl Meeting #102e, R1-2005825, Lenovo Motorla, Harq feedback of SPS PDSCH reception in multi-DCI based multiple TRPs (Year: 2020).*

(Continued)

*Primary Examiner* — Romani Ohri
(74) *Attorney, Agent, or Firm* — Holland & Hart LLP

(57) ABSTRACT

Methods, systems, and devices for wireless communications are described. A user equipment (UE) may support separate feedback for multiple semi-persistent scheduling (SPS) configurations. The UE may be configured with a set of uplink resources that includes a first subset of uplink resources associated with a first control resource set (CORESET) pool and a second subset of uplink resources associated with a second CORESET pool. The UE may receive first and second SPS downlink transmissions associated with the first and second CORESET pools, respectively. The UE may select a first uplink resource from the first subset of uplink resources and a second uplink resource from the second subset of uplink resources based on the SPS downlink transmissions or a payload of a respective feedback transmission. The UE may transmit one or more feedback transmissions in the first uplink resource or the second uplink resource.

30 Claims, 17 Drawing Sheets

(51) Int. Cl.
*H04W 72/0446* (2023.01)
*H04W 72/10* (2009.01)
*H04W 72/12* (2023.01)

(56) References Cited

U.S. PATENT DOCUMENTS

2021/0258981 A1* 8/2021 Hosseini ............ H04W 72/1278
2021/0321379 A1* 10/2021 Cirik ................... H04W 72/044
2022/0225400 A1* 7/2022 Wong .................... H04L 5/0044

OTHER PUBLICATIONS

International Search Report and Written Opinion—PCT/US2022/071865—ISA/EPO—dated Jul. 8, 2022 (2104103WO).
Lenovo., et al., "HARQ Feedback of SPS POSCH Reception in Multi-DCI Based Multiple TRPs", 3GPP TSG RAN WG1 Meeting #102e, 3GPP Draft, R1-2005825, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), 5 Pages, XP051915050, Retrieved from the Internet: URL: https://ftp.3gpp.org/tsg_ran/WG1_RL1/TSGR1_102-e/Docs/R1-2005825.zip, R1-2005825 HARQ-ACK feedback of SPS POSCH in multi-DCI based multiple TRPs.docx [retrieved on Aug. 7, 2020], The whole document.

* cited by examiner

SEPARATE FEEDBACK FOR SEMI-PERSISTENT SCHEDULING DOWNLINK WIRELESS COMMUNICATIONS

TECHNICAL FIELD

The following relates to wireless communication, including separate feedback for semi-persistent scheduling (SPS) downlink wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some communication devices may receive periodic downlink transmissions according to one or more SPS configurations. Some SPS configurations may correspond to different control resource set (CORESET) pools, and some communication devices may be configured to transmit joint feedback or separate feedback for downlink transmissions associated with different CORESET pools.

SUMMARY

The described techniques relate to improved methods, systems, devices, and apparatuses that support separate feedback for SPS downlink wireless communications. A UE may be configured with a set of PUCCH resources that includes a first subset of PUCCH resources associated with a first CORESET pool and a second subset of PUCCH resources associated with a second CORESET pool. These subsets of PUCCH resources may be referred to as PUCCH resource lists. One or more PUCCH resources of each PUCCH resource list may be non-overlapping in a time domain. The UE may receive a first SPS physical downlink shared channel (PDSCH) transmission associated with the first CORESET pool and a second SPS PDSCH transmission associated with the second CORESET pool. The UE may select a respective PUCCH resource from a respective PUCCH resource list, to transmit a respective feedback transmission (e.g., a hybrid automatic repeat request acknowledgment (HARQ-Ack) for a respective PDSCH transmission. By supporting separate PUCCH resource lists for separate HARQ-Ack transmissions, the UE may increase reliability and lower the latency of the HARQ-Ack transmissions, among other benefits.

A method for wireless communication at a UE is described. The method may include receiving control signaling indicating a configuration of a set of uplink resources, the set of uplink resources including a first subset of uplink resources associated with a first CORESET pool and a second subset of uplink resources associated with a second CORESET pool, receiving a set of SPS downlink transmissions including a first downlink transmission associated with the first CORESET pool and a second downlink transmission associated with the second CORESET pool, selecting a first uplink resource from the first subset of uplink resources and a second uplink resource from the second subset of uplink resources based on one or more of the first downlink transmission, the second downlink transmission, or a payload of a respective feedback transmission, and transmitting one or more feedback transmissions on one or more of the first uplink resource or the second uplink resource based at least in part on the selecting.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive control signaling indicating a configuration of a set of uplink resources, the set of uplink resources including a first subset of uplink resources associated with a first CORESET pool and a second subset of uplink resources associated with a second CORESET pool, receive a set of SPS downlink transmissions including a first downlink transmission associated with the first CORESET pool and a second downlink transmission associated with the second CORESET pool, select a first uplink resource from the first subset of uplink resources and a second uplink resource from the second subset of uplink resources based on one or more of the first downlink transmission, the second downlink transmission, or a payload of a respective feedback transmission, and transmit one or more feedback transmissions on one or more of the first uplink resource or the second uplink resource based at least in part on the selecting.

Another apparatus for wireless communication at a UE is described. The apparatus may include means for receiving control signaling indicating a configuration of a set of uplink resources, the set of uplink resources including a first subset of uplink resources associated with a first CORESET pool and a second subset of uplink resources associated with a second CORESET pool, means for receiving a set of SPS downlink transmissions including a first downlink transmission associated with the first CORESET pool and a second downlink transmission associated with the second CORE-SET pool, means for selecting a first uplink resource from the first subset of uplink resources and a second uplink resource from the second subset of uplink resources based on one or more of the first downlink transmission, the second downlink transmission, or a payload of a respective feedback transmission, and means for transmitting one or more feedback transmissions on one or more of the first uplink resource or the second uplink resource based at least in part on the selecting.

A non-transitory computer-readable medium storing code for wireless communication at a UE is described. The code may include instructions executable by a processor to receive control signaling indicating a configuration of a set of uplink resources, the set of uplink resources including a first subset of uplink resources associated with a first CORE-SET pool and a second subset of uplink resources associated with a second CORESET pool, receive a set of SPS downlink transmissions including a first downlink transmission associated with the first CORESET pool and a second downlink transmission associated with the second CORESET pool, select a first uplink resource from the first subset of uplink resources and a second uplink resource from the second subset of uplink resources based on one or more of the first downlink transmission, the second downlink transmission, or a payload of a respective feedback transmission, and transmit one or more feedback transmissions on one or more of the first uplink resource or the second uplink resource based at least in part on the selecting.

Some examples of the method, apparatuses, and non-transitory computer-readable medium described herein may further include operations, features, means, or instructions for determining that the first uplink resource from the first subset of uplink resources may be non-overlapping with the second uplink resource from the second subset of uplink resources in a time domain based on the configuration of the set of uplink resources, where transmitting the one or more feedback transmissions includes transmitting, in response to the first downlink transmission, a first feedback transmission on the first uplink resource based on the first uplink resource non-overlapping with the second uplink resource, and transmitting, in response to the second downlink transmission, a second feedback transmission on the second uplink resource based on the second uplink resource non-overlapping with the first uplink resource.

In some examples of the method, apparatuses, and non-transitory computer-readable medium described herein, receiving the control signaling may include operations, features, means, or instructions for receiving a radio resource control (RRC) configuration, the configuration indicating that each uplink resource associated with the first subset of uplink resources may be non-overlapping with each uplink resource associated with the second subset of uplink resources in a time domain and where transmitting the one or more feedback transmissions may be based on that each uplink resource associated with the first subset of uplink resources may be non-overlapping with each uplink resource associated with the second subset of uplink resources in the time domain.

In some examples of the method, apparatuses, and non-transitory computer-readable medium described herein, the first uplink resource from the first subset of uplink resources and associated with the first downlink transmission may be non-overlapping with a third uplink resource, the first uplink resource may be different from the third uplink resource, the first uplink resource including a PUCCH resource and the third uplink resource including a physical uplink shared channel (PUSCH) resource associated with the second CORESET pool.

Some examples of the method, apparatuses, and non-transitory computer-readable medium described herein may further include operations, features, means, or instructions for determining that the first uplink resource from the first subset of uplink resources may be overlapping with the second uplink resource from the second subset of uplink resources in a time domain based on the configuration of the set of uplink resources, where transmitting the one or more feedback transmissions includes, transmitting, in response to the first downlink transmission, a first feedback transmission on the first uplink resource based on the first uplink resource overlapping with the second uplink resource, and refraining from transmitting, in response to the second downlink transmission, a second feedback transmission on the second uplink resource based on the second uplink resource overlapping with the first uplink resource.

Some examples of the method, apparatuses, and non-transitory computer-readable medium described herein may further include operations, features, means, or instructions for determining a first priority of the first feedback transmission based on the first downlink transmission associated with the first CORESET pool and a second priority of the second feedback transmission based on the second downlink transmission associated with the second CORESET pool and where transmitting the first feedback transmission and refraining from transmitting the second feedback transmission may be based on the first priority being higher than the second priority.

Some examples of the method, apparatuses, and non-transitory computer-readable medium described herein may further include operations, features, means, or instructions for determining a set of codebooks based on the control signaling, the set of codebooks including a first codebook corresponding to a first priority and a second codebook corresponding to a second priority, the first subset of uplink resources associated with the first CORESET pool and the first priority, the second subset of uplink resources associated with the second CORESET pool and the first priority, a third subset of uplink resources associated with the first CORESET pool and the second priority, a fourth subset of uplink resources associated with the second CORESET pool and the second priority, where transmitting the one or more feedback transmissions may be based on the set of codebooks.

Some examples of the method, apparatuses, and non-transitory computer-readable medium described herein may further include operations, features, means, or instructions for determining a subsequent transmission time interval (TTI) for transmitting the one or more feedback transmissions based on one or more of the first uplink resource or the second uplink resource overlapping with a downlink resource in a time domain during a current TTI, where transmitting the one or more feedback transmissions includes transmitting the one or more feedback transmissions based on determining the subsequent TTI for transmitting the one or more feedback transmissions.

Some examples of the method, apparatuses, and non-transitory computer-readable medium described herein may further include operations, features, means, or instructions for selecting one or more of a third uplink resource from the first subset of uplink resources or a fourth uplink resource from the second subset of uplink resources based on a payload size of the one or more feedback transmissions and the first uplink resource or the second uplink resource overlapping with the downlink resource, where transmitting the one or more feedback transmissions includes transmitting the one or more feedback transmissions during the subsequent TTI and on one or more of the third uplink resource or the fourth uplink resource.

Some examples of the method, apparatuses, and non-transitory computer-readable medium described herein may further include operations, features, means, or instructions for jointly determining the subsequent TTI for transmitting the one or more feedback transmissions based on a criterion and irrespective of one or more of the first CORESET pool or the second CORESET pool, the criterion including that the subsequent TTI includes an uplink resource, the uplink resource including an uplink symbol.

Some examples of the method, apparatuses, and non-transitory computer-readable medium described herein may further include operations, features, means, or instructions for refraining from transmitting the one or more feedback transmissions during the subsequent TTI based on one or more of a third uplink resource from the first subset of uplink resources or a fourth uplink resource from the second subset of uplink resources overlapping with a second downlink resource in the time domain during the subsequent TTI, where refraining from transmitting the one or more feedback transmissions occurs separately for a first feedback transmission associated with the first CORESET pool and a second feedback transmission associated with the second CORESET pool based on one or more of the third uplink resource from the first subset of uplink resources or the fourth uplink resource from the second subset of uplink resources overlapping with the second downlink resource in the time domain during the subsequent TTI.

Some examples of the method, apparatuses, and non-transitory computer-readable medium described herein may further include operations, features, means, or instructions for determining a subsequent TTI for each of the one or more feedback transmissions based on one or more of the first uplink resource or the second uplink resource overlapping with a downlink resource in the time domain during the current TTI, determining that the subsequent TTI for each of the one or more feedback transmissions may be the same, where transmitting the one or more feedback transmissions includes transmitting the one or more feedback transmissions during the subsequent TTI based on time division multiplexing the subsequent TTI for each of the one or more feedback transmissions.

Some examples of the method, apparatuses, and non-transitory computer-readable medium described herein may further include operations, features, means, or instructions for determining the subsequent TTI for transmitting the one or more feedback transmissions based on one or more of the first CORESET pool, the second CORESET pool, a codebook associated with the one or more feedback transmissions, or an uplink resource associated with the one or more feedback transmissions non-overlapping with a downlink resource associated with the subsequent TTI.

Some examples of the method, apparatuses, and non-transitory computer-readable medium described herein may further include operations, features, means, or instructions for determining a first subsequent TTI for transmitting a first feedback transmission associated with the one or more feedback transmissions based on one or more of the first CORESET pool, or the first uplink resource overlapping with a downlink resource in a time domain during a current TTI, selecting a third uplink resource from the first subset of uplink resources based on a payload size of the first feedback transmission and the first uplink resource overlapping with the downlink resource, where transmitting the one or more feedback transmissions includes transmitting the first feedback transmission on the third uplink resource during the first subsequent TTI.

Some examples of the method, apparatuses, and non-transitory computer-readable medium described herein may further include operations, features, means, or instructions for determining the first subsequent TTI for transmitting a second feedback transmission associated with the one or more feedback transmissions based on one or more of the second CORESET pool, or the second uplink resource overlapping with the downlink resource in the time domain during the current TTI and selecting a fourth uplink resource from the second subset of uplink resources based on a payload size of the second feedback transmission and the second uplink resource overlapping with the downlink resource.

In some examples of the method, apparatuses, and non-transitory computer-readable medium described herein, transmitting the one or more feedback transmissions may include operations, features, means, or instructions for transmitting the second feedback transmission on the fourth uplink resource during the first subsequent TTI based on the fourth uplink resource non-overlapping with the third uplink resource.

Some examples of the method, apparatuses, and non-transitory computer-readable medium described herein may further include operations, features, means, or instructions for determining that the fourth uplink resource may be overlapping with the third uplink resource during the first subsequent TTI and refraining from transmitting the second feedback transmission on the fourth uplink resource during the first subsequent TTI based on the fourth uplink resource overlapping with the third uplink resource.

Some examples of the method, apparatuses, and non-transitory computer-readable medium described herein may further include operations, features, means, or instructions for determining a second subsequent TTI for transmitting the second feedback transmission associated with the one or more feedback transmissions based on the fourth uplink resource overlapping with the third uplink resource during the first subsequent TTI, where transmitting the one or more feedback transmissions includes transmitting the second feedback transmission during the second subsequent TTI.

In some examples of the method, apparatuses, and non-transitory computer-readable medium described herein, the first subset of uplink resources and the second subset of uplink resources correspond to separate feedback transmissions.

Some examples of the method, apparatuses, and non-transitory computer-readable medium described herein may further include operations, features, means, or instructions for receiving a downlink control information (DCI) message on a CORESET and determining that the CORESET corresponds to one or more of the first CORESET pool or the second CORESET pool, where receiving the set of SPS downlink transmissions including the first downlink transmission associated with the first CORESET pool and the second downlink transmission associated with the second CORESET pool may be based on the determining that the CORESET corresponds to one or more of the first CORESET pool or the second CORESET pool.

In some examples of the method, apparatuses, and non-transitory computer-readable medium described herein, the control signaling includes RRC signaling and the configuration includes an SPS configuration associated with the set of SPS downlink transmissions including the first downlink transmission associated with the first CORESET pool and the second downlink transmission associated with the second CORESET pool.

A method for wireless communication at a base station is described. The method may include transmitting control signaling indicating a configuration of a set of uplink resources, the set of uplink resources including a first subset of uplink resources associated with a first CORESET pool and a second subset of uplink resources associated with a second CORESET pool, transmitting a set of SPS downlink transmissions including a first downlink transmission associated with the first CORESET pool and a second downlink transmission associated with the second CORESET pool, and receiving one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources.

An apparatus for wireless communication at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit control signaling indicating a configuration of a set of uplink resources, the set of uplink resources including a first subset of uplink resources associated with a first CORESET pool and a second subset of uplink resources associated with a second CORESET pool, transmit a set of SPS downlink transmissions including a first downlink transmission associated with the first CORESET pool and a second downlink transmission associated with the second CORESET pool, and receive one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources.

Another apparatus for wireless communication at a base station is described. The apparatus may include means for transmitting control signaling indicating a configuration of a set of uplink resources, the set of uplink resources including a first subset of uplink resources associated with a first CORESET pool and a second subset of uplink resources associated with a second CORESET pool, means for transmitting a set of SPS downlink transmissions including a first downlink transmission associated with the first CORESET pool and a second downlink transmission associated with the second CORESET pool, and means for receiving one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources.

A non-transitory computer-readable medium storing code for wireless communication at a base station is described. The code may include instructions executable by a processor to transmit control signaling indicating a configuration of a set of uplink resources, the set of uplink resources including a first subset of uplink resources associated with a first CORESET pool and a second subset of uplink resources associated with a second CORESET pool, transmit a set of SPS downlink transmissions including a first downlink transmission associated with the first CORESET pool and a second downlink transmission associated with the second CORESET pool, and receive one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources.

In some examples of the method, apparatuses, and non-transitory computer-readable medium described herein, the first uplink resource from the first subset of uplink resources may be non-overlapping with the second uplink resource from the second subset of uplink resources in a time domain, and receiving the one or more feedback transmissions may include operations, features, means, or instructions for receiving, in response to the first downlink transmission, a first feedback transmission on the first uplink resource based on the first uplink resource non-overlapping with the second uplink resource and receiving, in response to the second downlink transmission, a second feedback transmission on the second uplink resource based on the second uplink resource non-overlapping with the first uplink resource.

In some examples of the method, apparatuses, and non-transitory computer-readable medium described herein, transmitting the control signaling may include operations, features, means, or instructions for transmitting an RRC configuration, the configuration indicating that each uplink resource associated with the first subset of uplink resources may be non-overlapping with each uplink resource associated with the second subset of uplink resources in a time domain, where receiving the one or more feedback transmissions may be based on that each uplink resource associated with the first subset of uplink resources may be non-overlapping with each uplink resource associated with the second subset of uplink resources in the time domain.

In some examples of the method, apparatuses, and non-transitory computer-readable medium described herein, the first uplink resource from the first subset of uplink resources and associated with the first downlink transmission may be non-overlapping with a third uplink resource, the first uplink resource may be different from the third uplink resource, the first uplink resource including a PUCCH resource and the third uplink resource including a PUSCH resource associated with the second CORESET pool.

In some examples of the method, apparatuses, and non-transitory computer-readable medium described herein, the first uplink resource from the first subset of uplink resources may be overlapping with the second uplink resource from the second subset of uplink resources in a time domain based on the configuration of the set of uplink resources, and receiving the one or more feedback transmissions may include operations, features, means, or instructions for receiving, in response to the first downlink transmission, a first feedback transmission on the first uplink resource based on the first uplink resource overlapping with the second uplink resource.

Some examples of the method, apparatuses, and non-transitory computer-readable medium described herein may further include operations, features, means, or instructions for transmitting, via the control signaling, an indication of a set of codebooks including a first codebook corresponding to a first priority and a second codebook corresponding to a second priority, the first subset of uplink resources associated with the first CORESET pool and the first priority, the second subset of uplink resources associated with the second CORESET pool and the first priority, a third subset of uplink resources associated with the first CORESET pool and the second priority, a fourth subset of uplink resources associated with the second CORESET pool and the second priority, where receiving the one or more feedback transmissions may be based on the set of codebooks.

Some examples of the method, apparatuses, and non-transitory computer-readable medium described herein may further include operations, features, means, or instructions for receiving the one or more feedback transmissions during a subsequent TTI and on one or more of a third uplink resource selected from the first subset of uplink resources or a fourth uplink resource selected from the second subset of uplink resources based on one or more of the first uplink resource or the second uplink resource overlapping with a downlink resource in a time domain during a current TTI.

DETAILED DESCRIPTION

Figure 1:
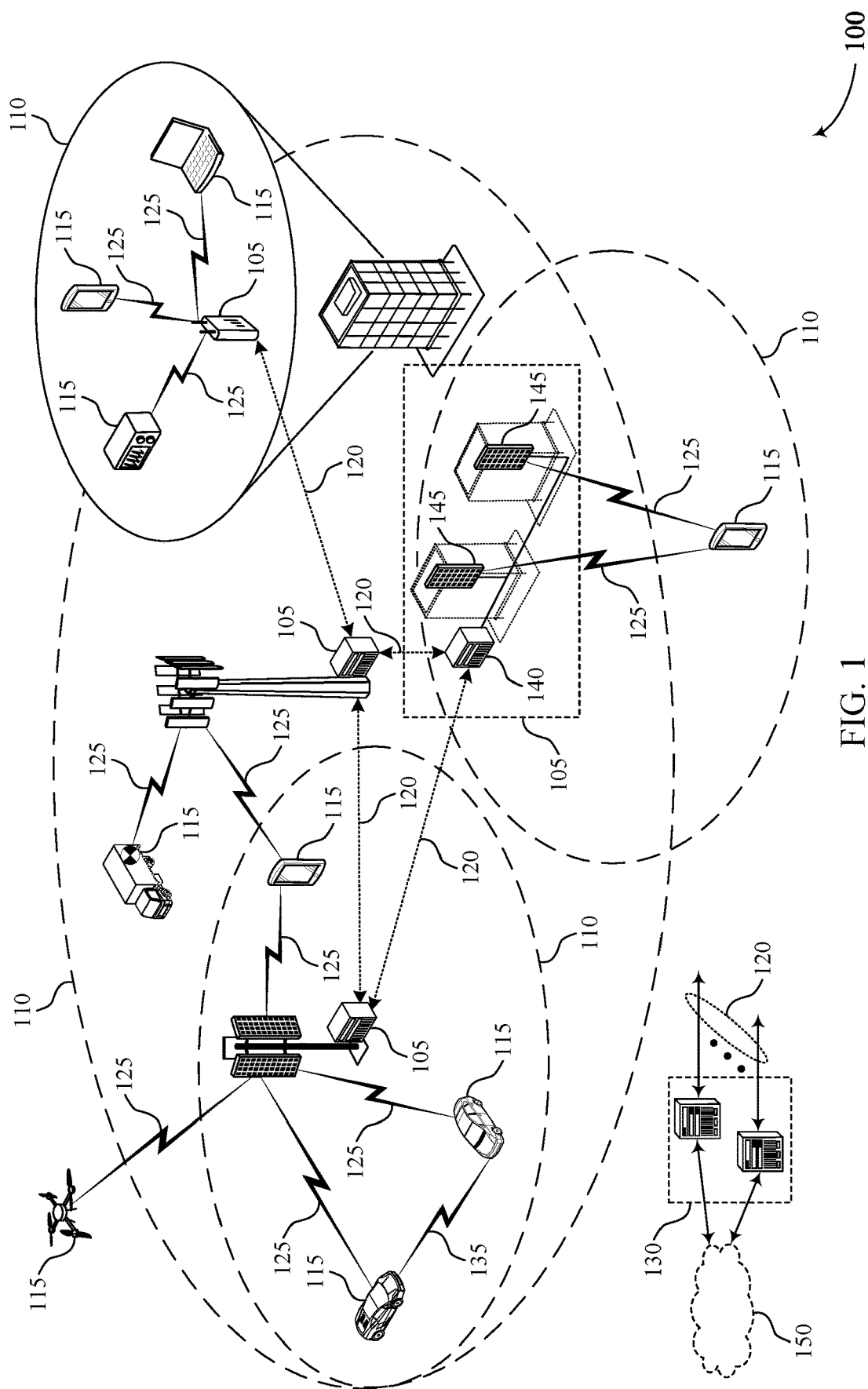
FIGS. 1 and 2 illustrate examples of wireless communications systems that support separate feedback for SPS downlink wireless communications in accordance with aspects of the present disclosure.

A wireless communications system may include communication devices, such as a UE and a base station (for example, an eNodeB (eNB), a next-generation NodeB or a giga-NodeB, any of which may be referred to as a gNB). The UE may receive periodic downlink transmissions on downlink resources based on a semi-persistent scheduling (SPS) configuration. For example, a UE may receive one or multiple SPS physical downlink shared channel (PDSCH) transmissions on one or multiple PDSCH resources. The UE may be configured with multiple SPS configurations across multiple component carriers, and may transmit respective feedback messages (e.g., hybrid automatic repeat request (HARQ) feedback) on a single uplink resource (e.g., physical uplink control channel (PUCCH) resource) for one or multiple PDSCH transmissions. In some cases, the UE may be configured to transmit separate feedback transmissions for each respective downlink transmission. For example, the UE may be configured to transmit a separate HARQ feedback transmission on separate PUCCH resources for each SPS PDSCH transmission. However, in some cases, these PUCCH resources for separate HARQ feedback transmissions may overlap in a time domain, which may impact the reliability of each of the separate HARQ feedback transmissions.

To eliminate or decrease the likelihood for an overlap between separate PUCCH resources for separate HARQ feedback transmissions, various aspects of the present disclosure relate to enabling the UE to convey separate HARQ feedback transmissions in accordance with PUCCH resource lists configured for the separate HARQ feedback transmissions. For example, if separate HARQ feedback transmissions are configured for two control resource set (CORESET) pool index values, the base station may configure a first subset of PUCCH resources (also referred to as a first PUCCH resource list) associated with a first CORESET pool index value, and a second subset of PUCCH resources (also referred to as a second PUCCH resource list) associated with a second CORESET pool index value. The separate HARQ feedback transmissions may thereby be in response to SPS PDSCH transmissions that correspond to separate CORESET pool index values. The UE may select a PUCCH resource from the first PUCCH resource list for transmitting a first HARQ feedback transmissions, and a PUCCH resource from the second PUCCH resource list for transmitting a second HARQ feedback transmission.

The base station may configure each PUCCH resource of a respective PUCCH resource list to be non-overlapping in a time domain with each PUCCH resource in another PUCCH resource list. In some examples, the UE may prioritize one of the CORESET pool index values, such that if two PUCCH resources overlap, the UE may drop the PUCCH resource scheduled for the lower priority CORESET pool index value. In some other examples, a HARQ feedback transmission collides with a downlink resource (e.g., a PDSCH resource), the UE may defer the HARQ feedback transmission. The UE may identify a next available transmission time interval (TTI) (e.g., a next symbol, a next slot) for deferring the HARQ feedback transmission irrespective of a CORESET pool index, or the UE may identify a next available TTI for deferring each HARQ feedback transmission independently based on each respective PUCCH resource list. In other examples, the UE may identify a next available TTI for the first CORESET pool index value first, or the UE may first select a next available TTI for the COREST pool index that includes an uplink resource that fits in the available TTI, and the UE may subsequently select another available TTI for the other CORESET pool index value.

Aspects of the disclosure are initially described in the context of wireless communications systems. Aspects of the disclosure are further illustrated by and described with reference to apparatus diagrams, system diagrams, and flowcharts that relate to separate feedback for SPS downlink wireless communications.

FIG. 1 illustrates an example of a wireless communications system 100 that supports separate feedback for SPS downlink wireless communications in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may support separate feedback for downlink transmissions configured via multiple SPS configurations and associated with multiple CORESET pools. The UE 115 may be configured with a set of uplink resources that includes a first subset of uplink resources associated with a first CORESET pool and a second subset of uplink resources associated with a second CORESET pool. For example, the UE 115 may be configured with a set of PUCCH resources that includes a first subset of PUCCH resources associated with a first CORESET pool and a second subset of PUCCH resources associated with a second CORESET pool. Each of these subsets of uplink resources may be referred to as uplink resource lists. For example, each subset of PUCCH resources may be referred to as a PUCCH resource list.

In the wireless communications system 100, the UE 115 may receive, from a base station 105, a first downlink transmission (e.g., a first SPS PDSCH transmission) associated with the first CORESET pool and a second downlink transmission (e.g., a second SPS PDSCH transmission) associated with the second CORESET pool. The first downlink transmission may be scheduled according to a first SPS configuration that corresponds to the first CORESET pool and the second downlink transmission may be scheduled according to a second SPS configuration that corresponds to the second CORESET pool. The base station 105 may include or be coupled with a first TRP and a second TRP associated with the first and second CORESET pools, respectively. The first TRP may transmit, to the UE 115, the first downlink transmission, while the second TRP may transmit, to the UE 115, the second downlink transmission.

The UE 115 may select a respective uplink resource from a respective uplink resource list, to transmit a respective feedback transmission for a respective downlink transmission. For example, the UE 115 may select a respective PUCCH resource from a respective PUCCH resource list, to transmit a respective feedback transmission (e.g., a HARQ-Ack transmission) for a respective PDSCH transmission. The UE 115 may select a first uplink resource from the first subset of uplink resources and a second uplink resource from the second subset of uplink resources based on one or more of the first downlink transmission, the second downlink transmission, or a payload of a respective feedback transmission.

One or more uplink resources of each uplink resource list may be non-overlapping in a time domain. For example, one or more PUCCH resources of each PUCCH resource list may be non-overlapping in a time domain. In some examples, an uplink resource selected for a feedback transmission in response to the first downlink transmission may not overlap in a time domain with an uplink resource selected for a feedback transmission in response to the second downlink transmission. The UE 115 may transmit one or more feedback transmissions to the base station 105 on the first uplink resource or the second uplink resource based on the selecting, the payload size, and whether there is overlap between the resources. By supporting separate uplink resource lists for separate feedback transmissions, the UE 115 may increase reliability and lower the latency of the feedback transmissions in the wireless communications system 100, among other benefits.

Figure 2:
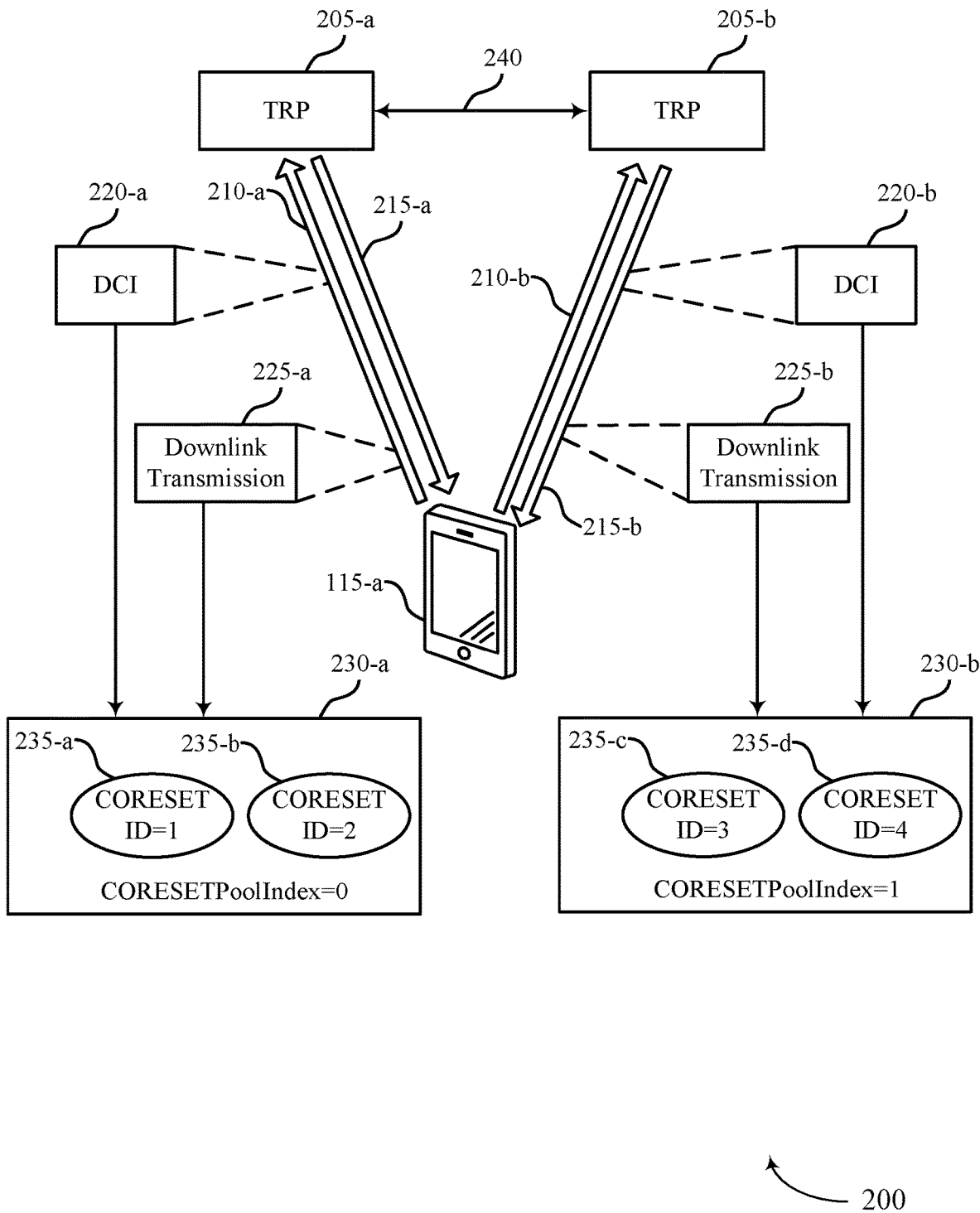

FIG. 2 illustrates an example of a wireless communications system 200 that supports separate feedback for SPS downlink wireless communications in accordance with aspects of the present disclosure. The wireless communications system 200 may implement aspects of the wireless communications system 100 or may be implemented by aspects of the wireless communications system 100. For example, the wireless communications system 200 may include a UE 115-a, which may represent an example of a UE 115 as described with reference to FIG. 1. In the example of FIG. 2, the UE 115-a may be in wireless communications with one or more other access network transmission entities, which may be referred to as radio heads, smart radio heads, or TRPs 205. For example, the UE 115-a may communicate with a TRP 205-a and a TRP 205-b, which the UE 115-a may differentiate according to a CORESET pool 230.

Each access network transmission entity may include one or more antenna panels. Various functions of each access network transmission entity may be distributed across various network devices (e.g., radio heads and ANCs) or consolidated into a single network device (e.g., a base station 105). In some examples, the TRP 205-a and the TRP 205-b may be associated with one or more base stations 105. The UE 115-a may support wireless communications in the wireless communications system 200 via the TRP 205-a and the TRP 205-b. For example, the UE 115-a may communicate with one or more of the TRP 205-a or the TRP 205-b via an uplink communication link 210-a and an uplink communication link 210-b, respectively. Additionally or alternatively, the UE 115-a may communicate with one or more of the TRP 205-a or the TRP 205-b via a downlink communication link 215-a and a downlink communication link 215-b, respectively. The TRP 205-a and TRP 205-b may communicate with each other via a backhaul link 240, which may be an example of a backhaul link 120 as described with reference to FIG. 1.

In the example of FIG. 2, each TRP 205 may transmit a downlink control information (DCI) 220 to the UE 115-a to schedule a respective PDSCH transmission. For example, the TRP 205-a may transmit a DCI 220-a on a physical downlink control channel (PDCCH) over the downlink communication link 215-a. The DCI 220-a may schedule a downlink transmission 225-a, which may be a PDSCH transmission. The TRP 205-b may transmit a DCI 220-b on a PDCCH over the downlink communication link 215-b. The DCI 220-b may schedule a downlink transmission 225-b, which may be a PDSCH transmission. Such communications may be referred to as multi-DCI based multi-TRP communications.

The UE 115-a may be configured with multiple CORESETs 235 (e.g., up to five CORESETs 235, or some other number of CORESETs 235). Each CORESET 235 (e.g., each of the CORESET 235-a, CORESET 235-b, CORESET 235-c, and CORESET 235-d) may be configured with an index value of a CORESET pool 230 (e.g., a value of a CORESETPoolIndex parameter). The CORESET pool index value may, in some examples, be either zero or one. That is, the CORESET pools 230 may group the CORESETs 235 into two groups. In the example of FIG. 2, the CORESET 235-a (e.g., CORESET ID=1) and the CORESET 235-b (e.g., CORESET ID=2) may be configured with a CORESET pool index value of zero, and may be part of the CORESET pool 230-a. The CORESET 235-c (e.g., CORE-SET ID=3) and the CORESET 235-d (e.g., CORESET ID=4) may be configured with a CORESET pool index value of one, and may be part of the CORESET pool 230-b.

The UE 115-a may determine whether a multi-DCI based multi-TRP reception is configured for a given serving cell based on a higher layer parameter (e.g., a PDCCH-Config parameter). If the PDCCH-Config parameter includes two different CORESET pool index values (e.g., two different values of CORESETPoolIndex) for CORESETs 235 of an active BWP of the serving cell, the UE 115-a may determine multi-DCI based multi-TRP reception is configured for the serving cell. The CORESET pool index of a CORESET 235 in which a DCI 220 is received may be used for different purposes, including for HARQ feedback configurations.

The UE 115-a may differentiate the first TRP 205-a from the second TRP 205-b during multi-DCI based multi-TRP communications based on an index of a CORESET pool 230 in which the DCI 220 transmitted by the respective TRP 205 was received (e.g., the different TRPs 205 may otherwise be transparent to the UE 115-a). For example, the UE 115-a may associate the TRP 205-a with the CORESET pool 230-a based on the association between the DCI 220-a and the CORESET pool 230-a. Likewise, the UE 115-a may associate the TRP 205-b with the CORESET pool 230-b based on the association between the DCI 220-b and the CORE-SET pool 230-b.

The UE 115-a may be configured to support joint feedback or separate feedback for the downlink transmissions 225 received from the multiple TRPs 205 (e.g., joint or separate HARQ feedback for multi-DCI based multi-TRP communications). The configuration of joint feedback or separate feedback may be based on a quality and type of the backhaul link 240 between the TRP 205-a and the TRP 205-b (e.g., a delay in communications between the TRP 205-a and the TRP 205-b), which may be determined by the network. If communications via the backhaul link 240 are associated with a relatively high quality (e.g., an ideal backhaul), the network may configure joint feedback by setting a parameter (e.g., ackNackFeedbackMode=joint) for a cell group (e.g., for a group of downlink serving cells that correspond to HARQ feedback transmitted via a same physical uplink control channel (PUCCH) cell).

For joint feedback, the UE 115-a may transmit feedback (e.g., a HARQ-Ack or HARQ negative acknowledgement HARQ-Nack) for both of the downlink transmission 225-a and the downlink transmission 225-b on a same uplink resource (e.g., a PUCCH resource). If the UE 115-a is provided with two or more CORESET index values for two or more active BWPs of a serving cell, and the UE 115-a is configured to perform joint feedback, the UE 115-a may transmit feedback for downlink transmissions corresponding to each CORESET pool index via a same uplink resource. The UE 115-a may reuse HARQ mechanisms used for carrier aggregation to transmit feedback for each of the CORESET pool 230-a and the CORESET pool 230-b (e.g., for each of the CORESET pool index values of zero and one) in each serving cell that is configured with multi-DCI based multi-TRP communications.

The UE 115-a may separate the HARQ feedback reporting procedures based on a CORSEST pool index value corresponding to each downlink transmission 225. For example, if a serving cell is not configured with a CORESET pool index value, the serving cell may be assumed by the UE 115-a to be part of the CORESET pool 230-a (e.g., CORE-SETPoolIndex value of zero). Similarly, if a serving cell is configured with two CORESET pool index values, the UE 115-a may consider the serving cell twice when reporting HARQ feedback. The separation of HARQ reporting procedures for each CORESET pool 230 may be performed dynamically by the UE 115-a. That is, the UE 115-a may support HARQ feedback for multi-DCI based multi-TRP communications for reception of downlink transmissions 225 via dynamic PDSCH occasions.

The UE 115-a may be configured with an SPS configuration for receiving the downlink transmissions 225 via periodic (e.g., semi-static) SPS PDSCH occasions. Additionally or alternatively, the UE 115-a may be configured with multiple SPS configurations for receiving the downlink transmissions 225 via multiple sets of periodic SPS PDSCH occasions. Each SPS configuration may correspond to a CORESET pool 230. Details of the SPS configurations are described in further detail elsewhere herein, including with reference to FIGS. 3 through 5. In some cases, the UE 115-a may not support separate feedback for one or more SPS configurations while performing multi-DCI based multi-TRP communications. Some techniques for scheduling uplink resources for feedback transmissions in response to periodic SPS PDSCHs may not account for separate feedback. That is, some techniques may allocate overlapping uplink resources for feedback messages corresponding to different CORSET pool indices, which may result in increased latency, interference, and reduced throughput of the communications.

As described herein, the UE 115-a may receive a control signal from the network indicating a configuration (e.g., a PUCCH-Config) for two or more subsets of uplink resources (e.g., two or more SPS-PUCCH-AN-Lists) for the UE 115-a to select from to perform feedback transmissions in response to downlink transmissions (e.g., SPS PDSCH transmissions) associated with an SPS configuration. The network may configure each uplink resource in the first subset to be non-overlapping in a time domain with each uplink resource in the second subset. The UE 115-a may thereby select an uplink resource from a first subset to perform a first feedback transmission and select an uplink resource from a second subset to perform a second feedback transmission without overlap between the first and second feedback transmissions. The UE 115-a may be configured with the two or more subsets of uplink resources if the UE 115-a is configured to perform separate feedback for two or more CORESET pools 230. The UE 115-a may use the two or more subsets of uplink resources to select an uplink resource for transmission of HARQ feedback in response to a downlink transmission 225 corresponding to an SPS configuration. If the UE 115-a transmits feedback in response to a non-SPS PDSCH, the UE 115-a may perform dynamic selection of an uplink resource, and the UE 115-a may refrain from using the two or more configured subsets of uplink resources. Details of the configured subsets of uplink resources (e.g., lists) are described in further detail elsewhere herein, including with reference to FIGS. 4 and 5.

The UE 115-a may identify an association between an SPS configuration and a CORESET pool 230 based on an RRC configuration or a CORESET 235 in which a DCI 220 that activates the SPS configuration is received. If the DCI 220 is received via a CORESET 235 that is not configured with a CORESET pool index value, the UE 115-a may assume the corresponding SPS configuration is associated with the CORESET pool 230-a (e.g., a CORESETPoolIndex value of zero). Additionally or alternatively, if an RRC configuration is not received for an SPS configuration, the UE 115-a may assume that the SPS configuration is associated with the CORESET pool 230-a (e.g., a CORESETPoolIndex value of zero). That is, if at least one serving cell in a cell group (or a PUCCH group) is configured with a CORESET pool index value, the UE 115-a will identify a correspondence between each of the other SPS configurations in the cell group and a CORESET pool 230 irrespective of whether each SPS configuration is configured for multi-DCI based multi-TRP communications.

The wireless communications system 200 may thus support separate feedback for one or more SPS configurations during multi-DCI based multi-TRP communications. The UE 115-a as described herein may additionally or alternatively be configured to support deferred HARQ feedback for the one or more SPS configurations during multi-DCI based multi-TRP communications. Details of the HARQ feedback deferral techniques may be described in further detail elsewhere herein, including with reference to FIG. 6.

Figure 3:
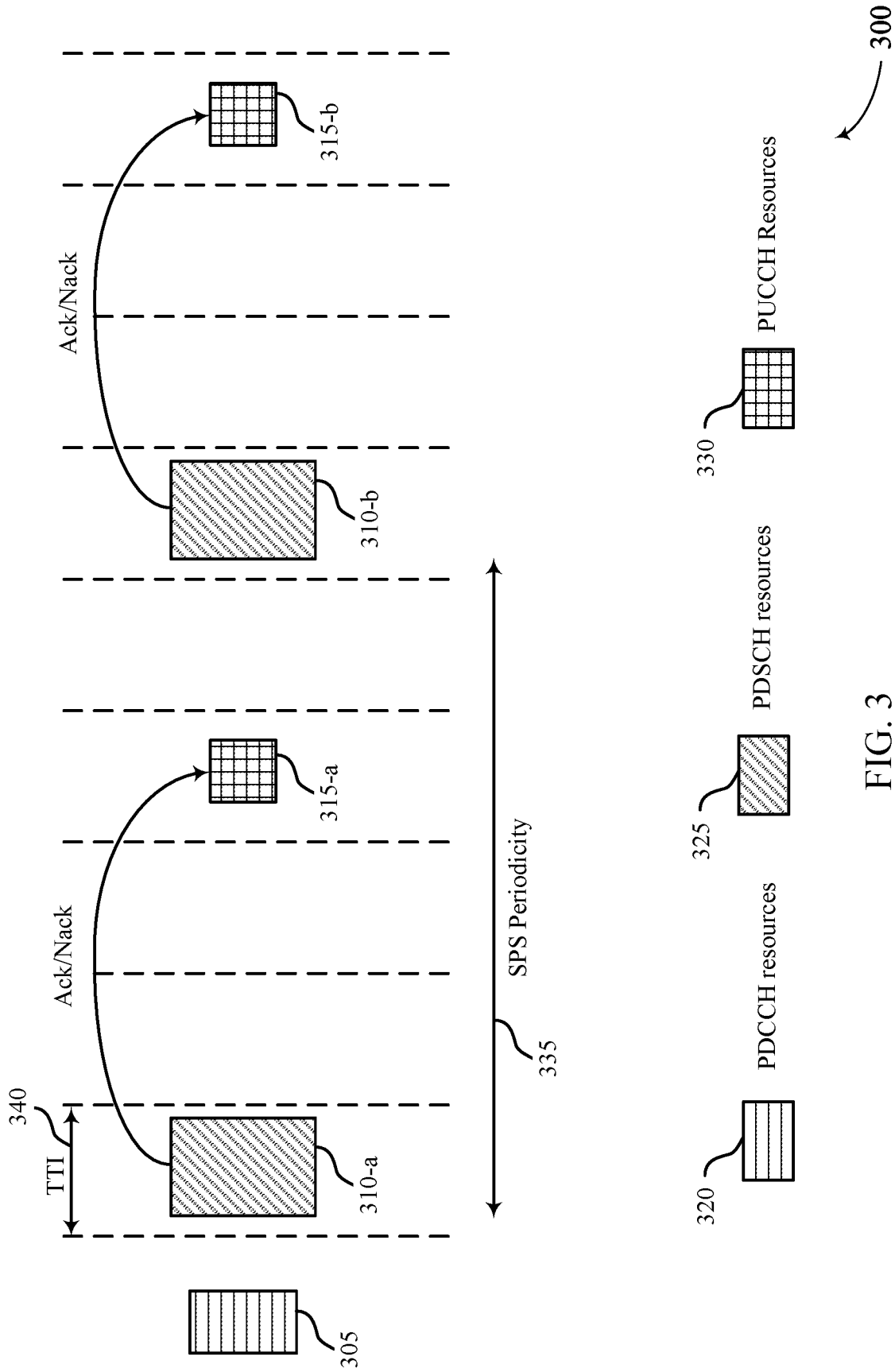
FIGS. 3 through 6 illustrate examples of transmission timelines that support separate feedback for SPS downlink wireless communications in accordance with aspects of the present disclosure.

FIG. 3 illustrates an example of a transmission timeline 300 that supports separate feedback for SPS downlink wireless communications in accordance with aspects of the present disclosure. The transmission timeline 300 may implement aspects of the wireless communications systems 100 and 200 or may be implemented by aspects of the wireless communications systems 100 and 200 as described with reference to FIGS. 1 and 2, respectively. For example, the transmission timeline 300 may be configured by a base station 105 or be implemented by the base station 105 and a UE 115, which may be examples of corresponding devices as described with reference to FIGS. 1 and 2.

The transmission timeline 300 illustrates a configuration of periodic SPS PDSCH transmissions 310 via PDSCH resources 325 allocated across multiple TTIs 340 (e.g., slots, subslots, or some other TTI 340). The periodic SPS PDSCH transmissions 310-a, 310-b, and other periodic SPS PDSCH transmissions 310 may be configured according to an SPS configuration. For example, an RRC configuration may configure one or more parameters for the SPS configuration, such as an SPS periodicity 335, a number of associated HARQ feedback transmissions, one or more PUCCH resources 330 corresponding to the SPS configuration, or other parameters.

In the example of FIG. 3, a base station 105 may transmit, to a UE 115, a DCI 305 on one or more PDCCH resources 320, which may activate an SPS configuration and the corresponding periodic SPS PDSCH transmissions 310 (e.g., an activation DCI 305). Based on the activation of the SPS configuration, the base station 105 may transmit, and the UE 115 may receive, the SPS PDSCH transmissions 310 based on an SPS periodicity 335. In some examples, the base station 105 may transmit, and the UE 115 may receive, the SPS PDSCH transmissions 310 based on the SPS periodicity 335 until another DCI (e.g., an SPS release DCI) releases the SPS configuration.

The DCI 305 may include one or more cyclic redundancy check (CRC) bits scrambled by a configured scheduling (CS) radio network temporary identifier (RNTI) (e.g., with NDI=0). In some examples, the DCI 305 may carry an indication (e.g., a DCI field or one or more DCI bits) that identify one or more other parameters for the SPS configuration, such as a time domain resource allocation (TDRA) and a frequency domain resource allocation (FDRA) for each SPS PDSCH transmission 310 (e.g., one or more PDSCH resources 325 for each SPS PDSCH occasion), a modulation coding scheme (MCS) for the SPS configuration, an offset between the DCI 305 and a first SPS PDSCH transmission 310-a (e.g., a K0 value), a timing between receiving an SPS PDSCH transmission 310 at the UE 115 and transmitting of a HARQ feedback transmission by the UE 115 (e.g., a K1 offset value), or any combination thereof.

The DCI 305 may configure an SPS configuration with a K1 value of three (e.g., a DCI field, such as a PDSCH-to-HARQ feedback timing indicator may convey a value of K1=3). The DCI 305 may configure a HARQ feedback transmission 315-*a* and a HARQ feedback transmission 315-*b* to occur after three TTIs 340 from the SPS PDSCH transmission 310-*a* and the SPS PDSCH transmission 310-*b*, respectively. In some examples, K1 may indicate an offset in units of subslots, slots, or some other TTI 340. A UE 115 may receive each SPS PDSCH transmission 310 and prepare to transmit a HARQ feedback transmission 315 (e.g., an ACK or a NACK) via a PUCCH resource 330 according to the indicated K1 value. For example, a UE 115 may transmit the HARQ feedback transmission 315-*a* three TTIs 340 after receipt of the SPS PDSCH transmission 310-*a*, and may transmit the HARQ feedback transmission 315-*b* three TTIs 340 after receipt of the SPS PDSCH transmission 310-*b*. The indicated K1 value may be the same for each SPS PDSCH transmission 310 included in the SPS configuration. Thus, a TTI of the PUCCH resources 330 for each HARQ feedback transmission 315 associated with the SPS configuration may be indicated via the DCI 305.

An allocation of the PUCCH resources 330 for each HARQ feedback transmission 315 may be configured via RRC signaling. For example, an RRC parameter (e.g., n1PUCCH-AN) may indicate, e.g., a starting symbol, a length, a quantity of resource blocks (RBs), a cyclic shift, a beam (e.g., spatial relation information), or any combination thereof of the PUCCH resources 330 for each TTI 340 that is to include the PUCCH resources 330 (e.g., based on the TTI indicated via the DCI 305). The periodic PUCCH resources 330 that are configured by the DCI and the RRC signaling may be used by the UE 115 to transmit the HARQ feedback transmission 315-*a* and the HARQ feedback transmission 315-*b*, such as HARQ-Ack or HARQ-Nack, in response to the SPS PDSCH transmission 310-*a* and the SPS PDSCH transmissions 310-*b*. The UE 115 may refrain from using the PUCCH resources 330 to transmit HARQ feedback in response to detection of a DCI or reception of other downlink transmissions in a respective TTI 340. Accordingly, a UE 115 may be configured with an SPS configuration across multiple TTIs 340 of a single carrier. In some examples, the UE 115 may be configured with multiple SPS configurations, as described in further detail elsewhere herein, including with reference to FIGS. 4 and 5.

Figure 4:
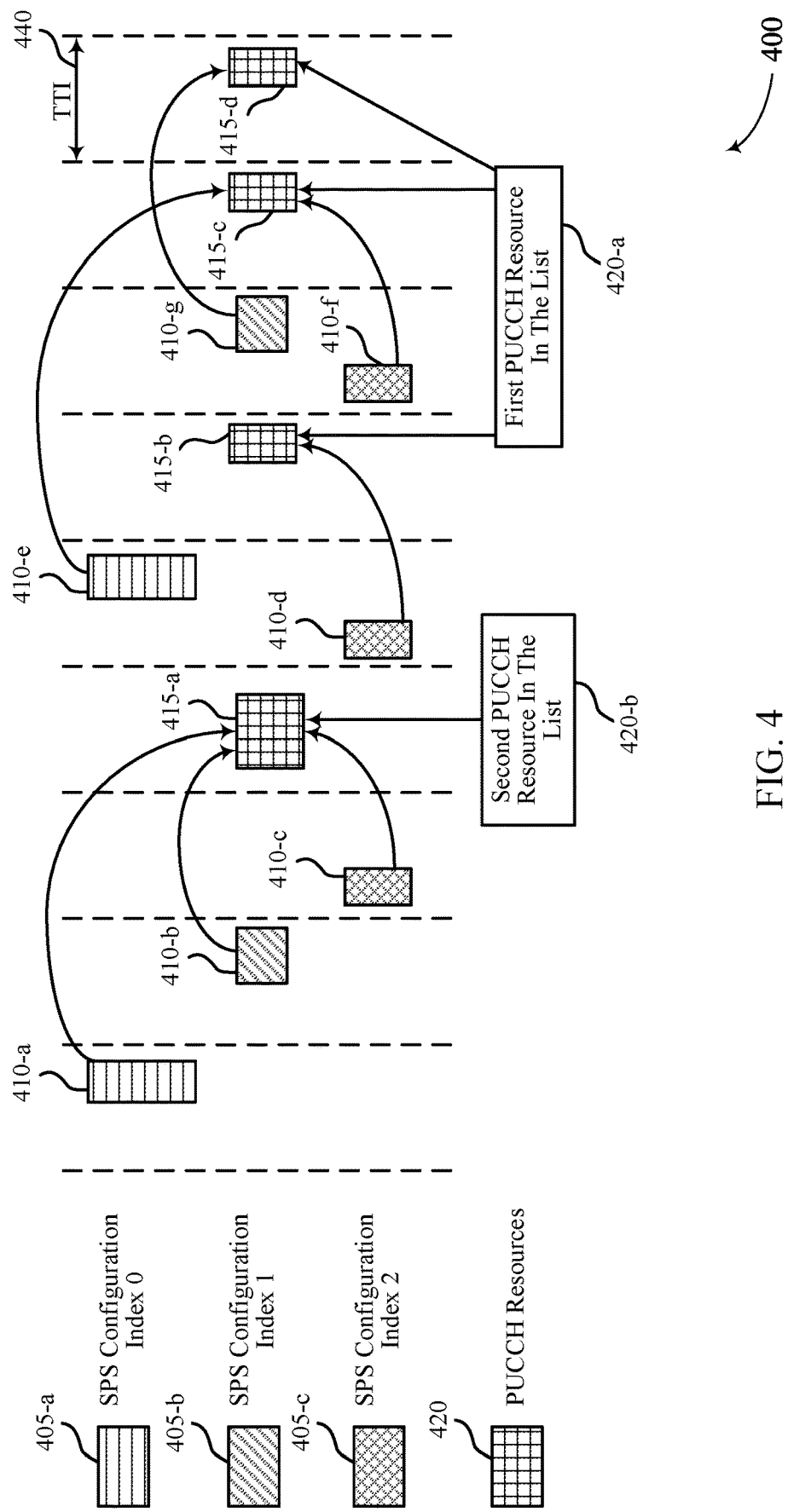

FIG. 4 illustrates an example of a transmission timeline 400 that supports separate feedback for SPS downlink wireless communications in accordance with aspects of the present disclosure. The transmission timeline 400 may implement aspects of the wireless communications systems 100 and 200 or may be implemented by aspects of the wireless communications systems 100 and 200 as described with reference to FIGS. 1 and 2, respectively. For example, the transmission timeline 400 may be configured by a base station 105 or be implemented by the base station 105 and a UE 115, which may be examples of corresponding devices as described with reference to FIGS. 1 and 2.

In the example of FIG. 4, a UE 115 may be configured with multiple SPS configurations 405 (e.g., an SPS configuration 405-*a*, an SPS configuration 405-*b*, and an SPS configuration 405-*c*) for receiving SPS PDSCH transmissions 410. Each SPS configuration 405 may be configured with a respective SPS configuration index. The SPS configurations 405 may be activated by a DCI, which may include a HARQ process number (HPN) field that may be repurposed to indicate each SPS configuration index that is activated (e.g., the HPN field may convey a parameter, such as sps-ConfigIndex). A DCI may configure each SPS configuration 405 with a respective K1 value and other parameters, as described with reference to FIG. 3. For example, the DCI may indicate a K1 value of three for the SPS configuration 405-*a*, a K1 value of two for the SPS configuration 405-*b*, and a K1 value of one for the SPS configuration 405-*c*. An RRC configuration may additionally or alternatively configure one or more other parameters for each SPS configuration 405. For example, the SPS configuration 405-*a* may be configured with an index of zero and an SPS periodicity of four. The SPS configuration 405-*b* may be configured with an index of one and an SPS periodicity of five. The SPS configuration 405-*c* may be configured with an index of two and an SPS periodicity of two.

The SPS configurations 405 may be configured across one or more serving cells. Multiple SPS configurations 405 across the one or more serving cells may be configured to report feedback via a same PUCCH resource 420. As such, a PUCCH resource 420 that is configured to carry HARQ feedback transmissions 415 for SPS PDSCH transmissions 410 that are associated with one or more SPS configurations 405 may support a different payload size depending on a number of HARQ feedback transmissions 415 that may be transmitted via PUCCH resource 420. The number of HARQ feedback transmissions 415 may be based on an SPS periodicity and a K1 value configured for each SPS configuration 405 in the one or more serving cells. Each of the SPS configuration 405-*a*, the SPS configuration 405-*b*, and the SPS configuration 405-*c* may be configured in a same downlink serving cell.

A TTI of each PUCCH resource 420 may be indicated via the K1 values for each SPS configuration 405, but a resource allocation for each PUCCH resource 420 may not be conveyed via DCI if multiple SPS configurations 405 are configured (e.g., the UE 115 may not receive DCI indicating the time and frequency PUCCH resources 420 for each SPS configuration 405). To allocate the PUCCH resources 420, the UE 115 may be configured with a subset, or list, of PUCCH resources 420 (e.g., SPS-PUCCH-AN-List). The subset may include multiple PUCCH resources 420 (e.g., four PUCCH resources 420, or some other quantity of PUCCH resources 420). Each PUCCH resource 420 in the subset may correspond to a different payload size. The UE 115 may select a PUCCH resource 420 from the subset for transmission of one or more HARQ feedback transmissions 415 in a respective TTI 440. For example, if the UE 115 is scheduled to transmit HARQ feedback for multiple SPS PDSCH transmissions 410 in a first TTI 440, the UE 115 may determine a payload size of the HARQ feedback transmission 415 based on a quantity of the multiple SPS PDSCH transmissions 410, and the UE 115 may select a PUCCH resource 420 from the subset based on the determined payload size.

In the example of FIG. 4, the UE 115 may be configured with a subset of four PUCCH resources 420. A first PUCCH resource 420-*a* in the subset may be configured to support a payload size of two bits or less. A second PUCCH resource 420-*b* in the subset may be configured to support a payload size that is greater than two bits and less than or the same as a configurable quantity of bits (e.g., a configurable maximum size for the second PUCCH resource 420-*b*). A third PUCCH resource 420 in the subset may be configured to support a payload size greater than the configurable quantity of bits for the second PUCCH resource 420-*b* and less than or the same as a configurable quantity of bits for the third PUCCH resource 420 (e.g., a configurable maximum size for the third PUCCH resource 420). A fourth PUCCH resource 420 in the subset may be configured to support a payload size greater than the configurable quantity of bits for the third PUCCH resource 420. Accordingly, the UE 115 may select a payload size from the four configured payload sizes for a HARQ feedback transmission 415 in a respective TTI 440.

In some examples, if the UE 115 is configured with the subset of four PUCCH resources 420 described above, the UE 115 may select the second PUCCH resource 420-*b* for performing the HARQ feedback transmission 415-*a*. The UE 115 may receive the SPS PDSCH transmissions 410-*a*, 410-*b*, and 410-*c* corresponding to each of the SPS configurations 405-*a*, 405-*b*, and 405-*c*, respectively. The SPS PDSCH transmissions 410 may be configured with respective K1 values such that each of the SPS PDSCH transmissions 410-*a*, 410-*b*, and 410-*c* correspond to a PUCCH resource 420 in the same TTI 440. The UE 115 may thereby determine that the HARQ feedback transmission 415-*a* may include a payload size of three bits or more. Accordingly, the UE 115 may select the second PUCCH resource 420-*b* from the subset (e.g., because the maximum configurable size for the second PUCCH resource 420-*b* is three or greater). The UE 115 may transmit the HARQ feedback transmission 415-*a* via the second PUCCH resource 420-*b*. The HARQ feedback transmission 415-*a* may include a HARQ-Ack or a HARQ-Nack for each of the SPS PDSCH transmissions 410-*a*, 410-*b*, and 410-*c*.

The UE 115 may select the first PUCCH resource 420-*a* from the subset for performing each of the HARQ feedback transmissions 415-*b*, 415-*c*, and 415-*d*. The UE 115 may receive the SPS PDSCH transmission 410-*d* corresponding to the SPS configuration 405-*c* associated with a K1 value of one. That is, the SPS PDSCH transmission 410-*d* may be configured with a PUCCH resource 420 in a subsequent TTI 440. The UE 115 may determine that a payload size for the HARQ feedback transmission 415-*b* may be one bit based on the single SPS PDSCH transmission 410-*d* that corresponds to the HARQ feedback transmission 415-*b*. The UE 115 may select the first PUCCH resource 420-*a* from the subset and perform the HARQ feedback transmission 415-*b* via the first PUCCH resource 420-*a* accordingly. The UE 115 may similarly select the first PUCCH resource 420-*a* for the HARQ feedback transmission 415-*d* corresponding to the SPS PDSCH transmission 410-*g*.

The SPS PDSCH transmissions 410-*e* and 410-*f* received by the UE 115 may be configured with PUCCH resources 420 in the same TTI 440. The UE 115 may determine that a payload size for the combined HARQ feedback transmission 415-*c* is two bits based on the two SPS PDSCH transmissions 410-*e* and 410-*f*. The UE 115 may thereby select the first PUCCH resource 420-*a* from the subset and perform the combined HARQ feedback transmission 415-*c* via the first PUCCH resource 420-*a* in response to the SPS PDSCH transmissions 410-*e* and 410-*f*. Accordingly, the UE 115 may be configured to transmit feedback corresponding to multiple SPS configurations 405 via a same PUCCH resource 420. To schedule the PUCCH resource 420, the UE 115 may be configured with a subset, or list, of one or more PUCCH resources 420 that each correspond to a different payload size. The UE 115 may select a PUCCH resource 420 from the subset based on a payload size of the corresponding HARQ feedback transmission 415.

As described with reference to FIG. 2, the UE 115 may receive the SPS PDSCH transmissions 410 from multiple TRPs (e.g., multi-DCI based multi-TRP communications). In such cases, each SPS configuration 405 may correspond to a different CORESET pool index. If the UE 115 is configured with separate feedback for each CORESET pool index (e.g., each TRP, which may correspond to a respective CORESET pool index), the UE 115 will transmit HARQ feedback transmissions 415 for the SPS configurations 405 that correspond to a first CORESET pool index via different PUCCH resources 420 than HARQ feedback transmissions 415 for the SPS configurations 405 that correspond to a second CORESET pool index.

In some cases, however, the subset of PUCCH resources configured for the UE 115 may not account for separate HARQ feedback. For example, if the SPS configuration 405-*a* corresponds to a first CORESET pool index value and the SPS configuration 405-*c* corresponds to a second CORESET pool index value, the UE 115 will transmit separate HARQ feedback transmissions 415 that are non-overlapping in a time domain for each of the SPS PDSCH transmissions 410-*e* and 410-*f*. Because the SPS PDSCH transmissions 410-*e* and 410-*f* correspond to PUCCH resources in the same TTI 440, the UE 115 may select the first PUCCH resource 420-*a* from the subset for each HARQ feedback transmission 415, which may result in overlap in the time domain between the HARQ feedback transmissions 415. As described herein, the UE 115 may be configured with two or more subsets of PUCCH resources 420 (e.g., two or more SPS-PUCCH-AN-Lists) to select from. Each subset may correspond to a respective CORESET pool index. In some examples, the subsets may include non-overlapping PUCCH resources 420, which may provide for the UE 115 to select a PUCCH resource 420 from each subset to perform separate HARQ feedback transmissions 415 without overlap. Details of the two or more subset are described in further detail elsewhere herein, including with reference to FIG. 5.

Figure 5:
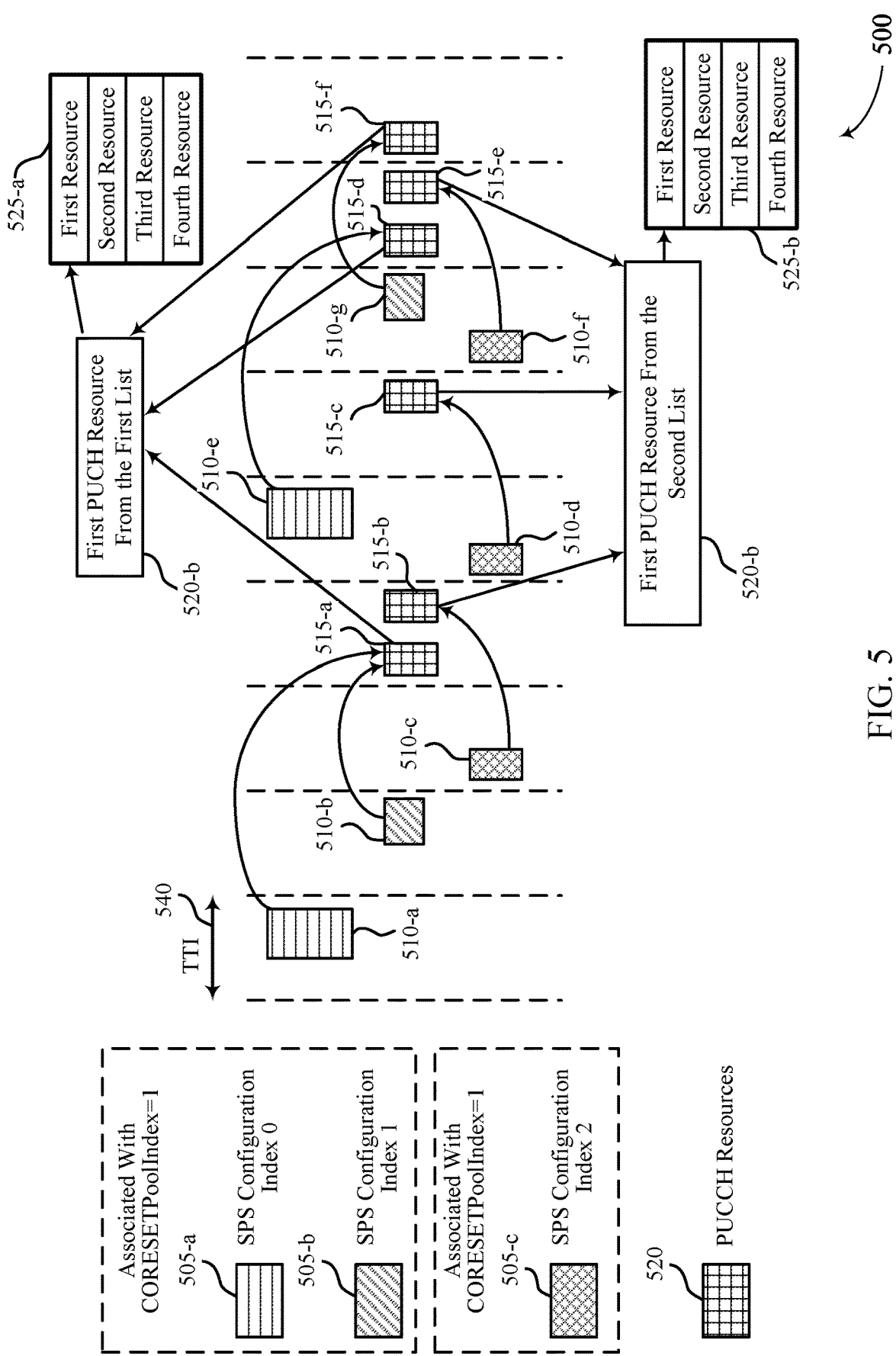

FIG. 5 illustrates an example of a transmission timeline 500 that supports separate feedback for SPS downlink wireless communications in accordance with aspects of the present disclosure. The transmission timeline 500 may implement aspects of the wireless communications systems 100 and 200 or may be implemented by aspects of the wireless communications systems 100 and 200 as described with reference to FIGS. 1 and 2, respectively. For example, the transmission timeline 500 may be configured by a base station 105 or be implemented by the base station 105 and a UE 115, which may be examples of corresponding devices as described with reference to FIGS. 1 and 2.

The UE 115 may be configured with multiple SPS configurations 505 (e.g., an SPS configuration 505-*a*, an SPS configuration 505-*b*, and an SPS configuration 505-*c*) for receiving SPS PDSCH transmissions 510. The SPS configurations 505 may be activated via a DCI, which may configure each SPS configuration 505 with a respective K1 value and other parameters, as described with reference to FIG. 3. The activation DCI may indicate a K1 value of three for the SPS configuration 505-*a*, a K1 value of two for the SPS configuration 505-*b*, and a K1 value of one for the SPS configuration 505-*c*. An RRC configuration may additionally or alternatively configure one or more other parameters for each SPS configuration 505 (e.g., a periodicity, index, PUCCH resources). For example, The SPS configuration 505-*a* may be configured with an index of zero and an SPS periodicity of four. The SPS configuration 505-*b* may be configured with an index of one and an SPS periodicity of five. The SPS configuration 505-*c* may be configured with an index of two and an SPS periodicity of two.

The UE 115 may receive the SPS PDSCH transmissions 510 associated with each SPS configuration 505 from one or more TRPs. For example, the SPS PDSCH transmissions 510 associated with the SPS configuration 505-*a* and the SPS configuration 505-*b* may be transmitted by a first TRP and the SPS PDSCH transmissions 510 associated with the SPS configuration 505-*c* may be received from a second TRP. The UE 115 may differentiate the first TRP from the second TRP based on respective CORESET pool index values, as described with reference to FIG. 2 (e.g., multi-DCI based multi-TRP communications). For example, the SPS configuration 505-*a* and the SPS configuration 505-*b* from the first TRP may correspond to a CORESET pool index value of zero, while the SPS configuration 505-*c* from the second TRP may correspond to a CORESET pool index value of one.

The UE 115 may identify the correspondence between the SPS configurations 505 and the respective CORESET pool indices based on DCI or an RRC configuration. In some examples, the UE 115 may receive, from the base station 105, a DCI message on a CORESET. The DCI may activate one or more SPS configurations 505. The UE 115 may determine that the CORESET corresponds to a CORESET pool index value, and the UE 115 may associate the SPS PDSCH transmissions 510 received according to the SPS configuration 505 with the CORESET pool index value based on the DCI message. In some other examples, the UE 115 may receive an RRC configuration for the SPS configuration 505, and the RRC configuration may configure a CORESET pool index value for the SPS configuration 505. If an RRC configuration is not received for an SPS configuration, or if a CORESET in which a DCI message is received is not associated with a CORESET pool index value, or both, the UE 115 may assume that the SPS configuration 505 is associated with the CORESET pool index value of zero. The UE 115 may identify the correspondence between each SPS configuration 505 in a serving cell group and a respective CORESET pool index value if at least one serving cell in the group is configured with one or more CORESET pool index values.

The UE 115 may be configured with separate HARQ feedback for each CORESET pool index value. That is, the UE 115 may transmit a HARQ feedback transmission 515 for SPS PDSCH transmissions 510 associated with the SPS configuration 505-*a* and the SPS configuration 505-*b* and the CORESET pool index value of zero via separate PUCCH resources 520 than HARQ feedback transmissions 515 for SPS PDSCH transmissions 510 associated with the SPS configuration 505-*c* and the CORESET pool index value of one. As described with reference to FIG. 4, because the UE 115 may not receive a DCI to indicate a PUCCH resource 520 for each HARQ feedback transmission 515 during SPS communications, the UE 115 may be configured with a subset of PUCCH resources 520, which may be referred to as a PUCCH resource list 525, to use for allocating PUCCH resources 520 for each HARQ feedback transmission 515. A PUCCH resource 520 may be selected from the PUCCH resource list 525 for each HARQ feedback transmission 515 based on a payload size. However, if the UE 115 is configured with a single PUCCH resource list 525, the UE 115 may not be able to ensure that two PUCCH resources 520 for two separate HARQ feedback transmissions 515 in a same TTI 540 are non-overlapping in time.

As described herein, the UE 115 may be configured with two or more separate PUCCH resource lists 525 (e.g., SPS-PUCCH-AN-Lists, which may each include a respective subset of PUCCH resources 520). Each PUCCH resource list 525 may correspond to a respective CORESET pool index value, such that the UE 115 may select non-overlapping PUCCH resources 520 for two or more separate HARQ feedback transmissions 515 in a same TTI 540. In the example of FIG. 5, the first PUCCH resource list 525-*a* may be associated with the CORESET pool index value of zero (e.g., and a first TRP), and the second PUCCH resource list 525-*b* may be associated with the CORESET pool index value of one (e.g., and a second TRP). The UE 115 may be configured with the two PUCCH resource lists 525-*a* and 525-*b* if separate HARQ feedback is configured for the two CORESET pool index values (e.g., if ackNackFeedbackMode=separate for the two CORESET-PoolIndex values of 0 and 1).

The UE 115 may select a PUCCH resource 520 from one or both of the PUCCH resource lists 525-*a* and 525-*b* for a HARQ feedback transmission 515 (e.g., a HARQ ACK or HARQ negative acknowledgment (NACK) (HARQ-Nack) message) for one or more SPS PDSCH transmissions 510 (e.g., periodic SPS PDSCH transmissions 510 that are configured via an SPS configuration 505) corresponding to the respective CORESET pool index value. The UE 115 may not select a PUCCH resource 520 from the PUCCH resource lists 525 for transmission of dynamic HARQ feedback messages in response to a DCI or other semi-static transmissions in a same TTI 540. The UE 115 may select a PUCCH resource 520 from each PUCCH resource list 525 based on a payload size of the HARQ feedback transmission 515, as described with reference to FIG. 4.

An activation DCI may indicate respective K1 values for each of the SPS PDSCH transmission 510-*a*, 510-*b*, and 510-*c* such that each of the SPS PDSCH transmissions 510-*a*, 510-*b*, and 510-*c* corresponds to a PUCCH resource 520 in a same TTI 540. However, the SPS PDSCH transmissions 510-*a* and 510-*b* may be configured by the SPS configurations 505-*a* and 505-*b*, respectively, which may be associated with a CORESET pool index value of zero. The SPS PSDCH transmission 510-*c* may be configured by the SPS configuration 505-*c*, which may be associated with a CORESET pool index value of one. As such, if the UE 115 is configured with separate HARQ feedback, the UE 115 may select non-overlapping PUCCH resources 520 in the TTI 540 for transmission of two HARQ feedback transmissions 515-*a* and 515-*b* corresponding to each CORESET pool index value. The UE 115 may determine that a payload size of the HARQ feedback transmission 515-*a* may be two bits based on the SPS PDSCH transmissions 510-*a* and 510-*b*. The UE 115 may select the first PUCCH resource 520-*a* from the first PUCCH resource list 525-*a* for the HARQ feedback transmission 515-*a* based on the payload size. The UE 115 may select the first PUCCH resource 520-*b* from the second PUCCH resource list 525-*b* for the HARQ feedback transmission 515-*b* based on a payload size corresponding to the single SPS PDSCH transmission 510-*c*. The UE 115 may perform similar PUCCH resource selections from the first and second PUCCH resource lists 525-*a* and 525-*b* for each of the HARQ feedback transmissions 515-*c*, 515-*d*, 515-*e*, and 515-*f*.

To ensure that two PUCCH resources 520 in a same TTI 540 are non-overlapping in time, each PUCCH resource 520 in the first PUCCH resource list 525-*a* may be configured to be non-overlapping in time with each PUCCH resource 520 in the second PUCCH resource list 525-*b*. In some examples, the UE 115 may select the first PUCCH resource 520-*a* in the first PUCCH resource list 525-*a* for the HARQ feedback transmission 515-*d* and the first PUCCH resource 520-*b* in the second PUCCH resource list 525-*b* for the HARQ feedback transmission 515-*e* in the same TTI 540. The PUCCH resources 520-*a* and 520-*b* may be non-overlapping in time due to the configurations of the PUCCH resource lists 525-*a* and 525-*b*. Although not pictured in FIG. 5, the UE 115 may select the second, third, or fourth PUCCH resources 520 from each PUCCH resource list 525 if a payload size of a HARQ feedback transmission is larger (e.g., three bits or more). Any combination of two PUCCH resources 520 in different PUCCH resource list 525 may be non-overlapping in time. For example, the second PUCCH resource 520 in the first PUCCH resource list 525-a may be non-overlapping with any of the first, second, third, and fourth PUCCH resources 520 in the second PUCCH resource list 525-b.

The UE 115 may additionally or alternatively select the first PUCCH resource 520-a from the first PUCCH resource list 525-a such that the first PUCCH resource 520-a is non-overlapping with any other uplink resources (e.g., PUCCH resources 520 or physical uplink shard channel (PUSCH) resources) associated with the CORESET pool index value of one. That is, a PUCCH resource 520 containing a HARQ feedback transmission 515 for an SPS configuration 505 associated with a first CORESET pool index value may not overlap with an uplink resource associated with a second CORESET pool index value. In some examples, two PUCCH resources 520 in a same TTI 540 may overlap in time. For example, a PUCCH resource 520 selected for the HARQ feedback transmission 515-f in response to the SPS PDSCH transmission 510-g may overlap with a PUCCH resource selected for another HARQ feedback transmission 515 corresponding to a SPS PDSCH transmission 510 associated with a different CORESET pool index value. In such cases, the UE 115 may prioritize one of the HARQ feedback transmissions 515.

The UE 115 may be configured to prioritize HARQ feedback transmissions 515 associated with the CORESET pool index value of zero over HARQ feedback transmissions 515 associated with the CORESET pool index value of one, or vice versa. The UE 115 may transmit the prioritized HARQ feedback transmission 515, and the UE 115 may drop the other HARQ feedback transmission 515. For example, the UE 115 may transmit the HARQ feedback transmission 515-f corresponding to the CORESET pool index value of zero, and the UE 115 may drop the other HARQ feedback transmission 515 corresponding to the CORSEET pool index value of one. If the PUCCH resources 520 are not overlapping, the UE 115 will transmit both HARQ feedback transmissions 515.

In some examples, the UE 115 may be configured to generate two or more HARQ codebooks corresponding to two or more priorities (e.g., the UE 115 may be configured with pdsch-HARQ-ACK-CodebookList). The UE 115 may generate a first codebook corresponding to a first priority and a second codebook corresponding to a second priority. In such cases, the UE 115 may be configured with four PUCCH resource lists 525. For example, the first PUCCH resource list 525-a may be associated with the first CORE-SET pool index value and the first priority, the second PUCCH resource list 525-b may be associated with the second CORESET pool index value and the first priority, a third PUCCH resource list 525 may be associated with the first CORESET pool index value and the second priority, and a fourth PUCCH resource list 525 may be associated with the second CORESET pool index value and the second priority.

Accordingly, a UE 115 as described herein may be configured with two or more PUCCH resource lists 525. The UE 115 may use the two or more lists for transmitting separate HARQ feedback in response to SPS PDSCH transmissions 510 configured by SPS configurations 505 that are associated with different CORESET pool indices. The UE 115 may select PUCCH resources 520 from each PUCCH resource list 525 such that two or more separate HARQ feedback transmissions 515 are non-overlapping. The two or more PUCCH resource lists 525 may improve communication reliability, improve coordination between devices, and reduce latency.

Figure 6:
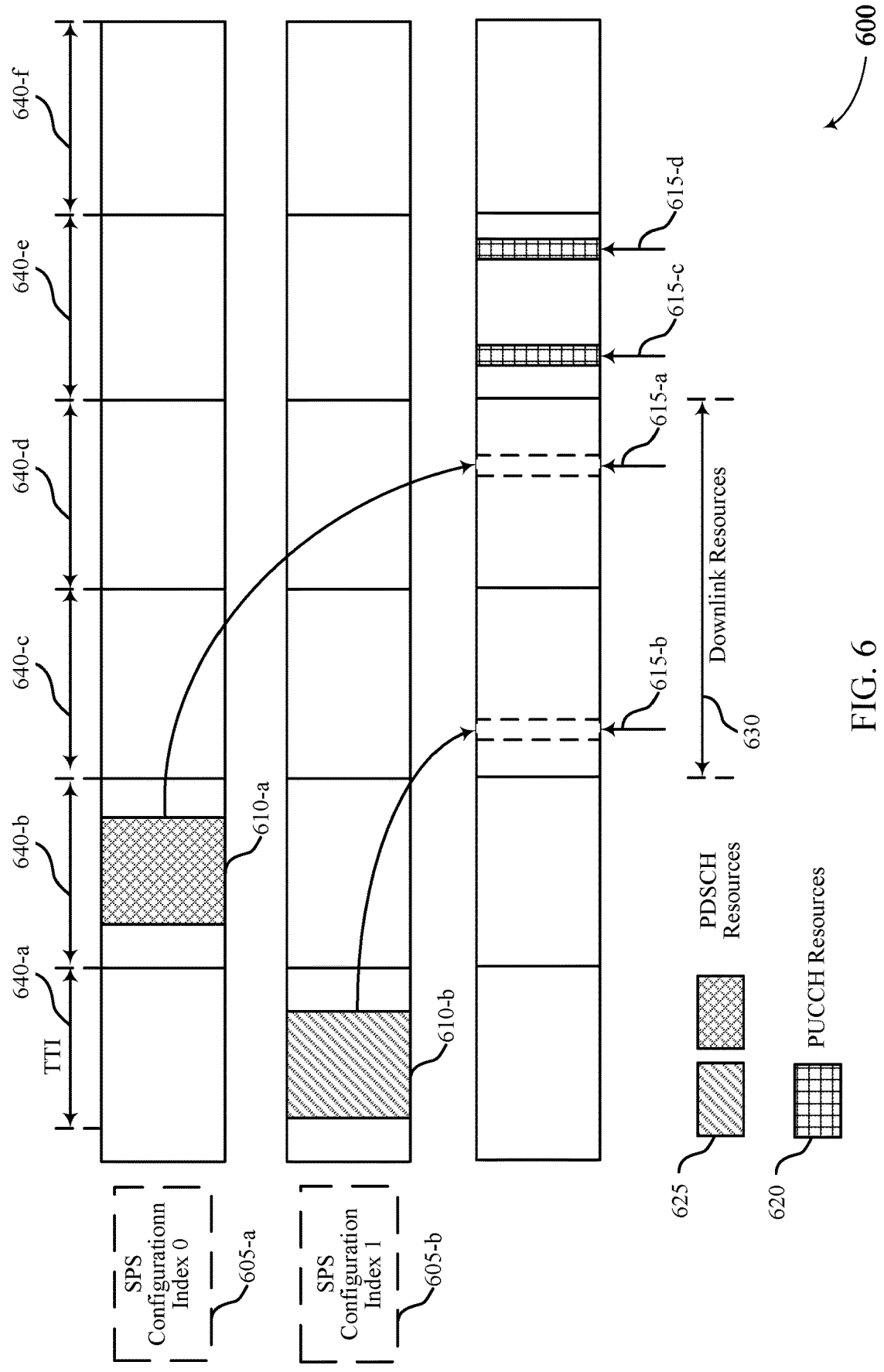

FIG. 6 illustrates an example of a transmission timeline 600 that supports separate feedback for SPS downlink wireless communications in accordance with aspects of the present disclosure. The transmission timeline 600 may implement aspects of the wireless communications systems 100 and 200 or may be implemented by aspects of the wireless communications systems 100 and 200 as described with reference to FIGS. 1 and 2, respectively. For example, the transmission timeline 600 may be configured by a base station 105 or be implemented by the base station 105 and a UE 115, which may be examples of corresponding devices as described with reference to FIGS. 1 and 2.

The transmission timeline 600 may illustrate wireless communications between the base station 105 and the UE 115 across multiple TTIs 640 (e.g., TTIs 640-a through 640-f). In some examples, the UE 115 may defer a feedback transmission to a subsequent TTI 640 (e.g., a slot, subslot, or other TTI 640) if a first PUCCH resource 620 allocated for a HARQ feedback transmission 615 collides with a downlink symbol or other transmission. In some cases, a UE 115 that is configured with a single SPS configuration 605 or with joint feedback across multiple SPS configurations 605 may support HARQ feedback deferral. That is, if a PUCCH resource 620 carrying a HARQ feedback transmission 615 (e.g., HARQ-Ack) collides with a downlink resource 630 (e.g., an RRC configured downlink symbol, slot, or some other resource), the PUCCH resource 620 may be deferred to a subsequent TTI 640 (e.g., an earliest available TTI 640 that can accommodate the PUCCH resource 620).

A collision between a PUCCH resource 620 and a downlink resource 630 may be an overlap between the resources in a time domain (e.g., a TDD-specific collision). The UE 115 may check each TTI 640 after the TTI 640 in which the original PUCCH resource 620 collided with another transmission until the UE 115 finds an available TTI 640. An available TTI 640 may be a TTI 640 that includes uplink symbols, flexible symbols, or both. In one example, the initial TTI 640 carrying the initial PUCCH resource 620 may be determined by a K1 value corresponding to the corresponding SPS configuration 605 (e.g., via an activation DCI). The UE 115 may identify a target TTI 640 delayed from the initial TTI 640 by an offset (e.g., $K1+K1_{def}$).

The UE 115 may be configured with multiple SPS configurations 605 that may correspond to one or more CORE-SET pool index values, as described with reference to FIG. 5. In the example of FIG. 6, an SPS configuration 605-a (e.g., an SPS configuration with index 0) may correspond to a CORESET pool index value of zero and an SPS configuration 605-b (e.g., an SPS configuration with index 1) may correspond to a CORESET pool index value of one. If the UE 115 is configured with first and second PUCCH resource lists corresponding to each CORESET pool index value, the UE 115 will select an initial PUCCH resource 620 for each SPS configuration 605 from a respective list. In such cases, if the initial PUCCH resource 620 collides with a downlink resource 630, the HARQ feedback transmission 615 may be deferred.

To perform HARQ feedback deferral for the SPS configurations 605 corresponding to different CORESET pool index values, the UE 115 may select deferred PUCCH resources 620 separately for each CORESET pool index value. The UE 115 may use the first PUCCH resource list associated with the CORESET pool index value zero to determine a first PUCCH resource 620 within a first next available TTI 640 based on a first payload size. The UE 115 may use the second PUCCH resource list associated with CORESET pool index value one to determine a second PUCCH resource 620 within a second next available TTI 640 based on a second payload size. In some examples, the first and second next available TTIs 640 may be the same.

The UE 115 may receive the SPS PDSCH transmission 610-a corresponding to the SPS configuration 605-a and the first CORESET pool index value in the TTI 640-b. The SPS configuration 605-a may correspond to a K1 value of two, such that an initial PUCCH resource 620 for a HARQ feedback transmission 615-a in response to the SPS PDSCH transmission 610-a may be in the TTI 640-d. The UE 115 may additionally or alternatively receive the SPS PDSCH transmission 610-b corresponding to the SPS configuration 605-b and the second CORESET pool index value in the TTI 640-a. The SPS configuration 605-b may correspond to a K1 value of two, such that an initial PUCCH resource 620 for a HARQ feedback transmission 615-b in response to the SPS PDSCH transmission 610-b may be in the TTI 640-c. However, the TTIs 640-c and 640-d may include the downlink resources 630 (e.g., RRC configured downlink symbols or slots), and the initial HARQ feedback transmissions 615-a and 615-b may collide with the downlink resources 630. The UE 115 may thereby use one or more procedures for identifying a subsequent TTI 640 (e.g., a next available TTI 640) for each of the HARQ feedback transmissions 615.

The one or more procedures for identifying the subsequent TTI 640 may include identifying a next available TTI 640 irrespective of a CORESET pool index value, identifying a next available TTI 640 for each CORESET pool index value separately, identifying a first next available TTI 640 for a first CORESET pool index value first, then identifying a second next available TTI 640 for the second CORESET pool index value based on the first next available TTI 640, identifying a next available TTI 640 based on which PUCCH resource 620 fits in the TTI 640, or any combination thereof. The UE 115 may identify the subsequent TTI 640 that is available, and the UE 115 may select a PUCCH resource 620 from each PUCCH resource list to use for each deferred HARQ feedback transmission 615, as described with reference to FIG. 5. The selected PUCCH resources 620 from each PUCCH resource list may be based on a payload size of the deferred HARQ feedback transmissions 615-c and 615-d and may be the same as or different from the PUCCH resource 620 selected for the initial HARQ feedback transmissions 615-a and 615-b.

The UE 115 may jointly determine the next available TTI 640 based on the TTI 640 including at least one PUCCH resource 620 and irrespective of the CORESET pool indices. For example, the UE 115 may determine that the TTI 640-e includes at least one PUCCH resource 620, and the UE 115 may select a PUCCH resource 620 from each of the first PUCCH resource list and the second PUCCH resource list for deferred transmission of the HARQ feedback transmissions 615-c and 615-d. If one or both of the selected PUCCH resources 620 collide with a downlink resource 630 in the TTI 640-e, the UE 115 will drop the HARQ feedback transmission 615-c, 615-d, or both, in the respective collided PUCCH resource 620 without deferral.

In some examples, the UE 115 may determine a first TTI 640 for deferral of the HARQ feedback transmission 615-a and a second TTI 640 for deferral of the HARQ feedback transmission 615-b separately based on whether a first PUCCH resource 620 selected for the HARQ feedback transmission 615-a or a second PUCCH resource 620 selected for the HARQ feedback transmission 615-b overlaps with a downlink resource 630 in the time or frequency domain during the TTIs 640-a and 640-b, respectively. If the first TTI 640 and the second TTI 640 are the same, such as the TTI 640-e, the UE 115 will TDM the TTI 640-e for each of the deferred HARQ feedback transmissions 615-c and 615-d (e.g., so the HARQ feedback transmission 615-c does not overlap with the HARQ feedback transmission 615-d in a time domain). In some examples, the UE 115 may TDM the HARQ feedback transmissions 615 by selecting non-overlapping PUCCH resources 620 from respective PUCCH resource lists, or the UE 115 may prioritize one of the HARQ feedback transmissions 615 based on a priority of a corresponding CORESET pool index value, as described with reference to FIG. 5.

The UE 115 may determine a first TTI 640 for the deferred HARQ feedback transmission 615-d (e.g., a deferral of the initial HARQ feedback transmission 615-a) based on the first PUCCH resource 620 selected for the initial HARQ feedback transmission 615-a overlapping with a downlink resource 630, based on the first CORESET pool, or both. The UE 115 may select a PUCCH resource 620 from the first PUCCH resource list based on a payload size for the HARQ feedback transmission 615-d, and the UE 115 may transmit the HARQ feedback transmission 615-d via the selected PUCCH resource in the TTI 640-e accordingly. The UE 115 may subsequently select a second TTI 640 for the deferred HARQ feedback transmission 615-c (e.g., a deferral of the initial HARQ feedback transmission 615-b) based one or more of the selected PUCCH resource 620 for the HARQ feedback transmission 615-d, the second PUCCH resource 620 selected for the initial HARQ feedback transmission 615-b overlapping with a downlink resource 630, or the second CORESET pool.

That is, the UE 115 may be configured to select a PUCCH resource 620 for deferring HARQ feedback transmissions 615 associated with a CORESET pool index value of zero before selecting a PUCCH resource 620 for deferral of HARQ feedback transmissions 615 associated with a CORESET pool index value of one (e.g., or vice versa). The UE 115 may take the first resource selection into account when performing the second resource selection. In the example of FIG. 6, the UE 115 may determine that the second PUCCH resource 620 identified by the UE 115 will not overlap with the first determined PUCCH resource 620 in the TTI 640-e, and the UE 115 may transmit both of the HARQ feedback transmissions 615-c and 615-d in the same TTI 640-e. In some examples, however, if the second PUCCH resource(s) 620 identified by the UE 115 would overlap with the first determined PUCCH resources 620 in the first next available TTI 640-e, the UE 115 may assume that the first next available TTI 640-e is unavailable for determination of a second available TTI 640. In such cases, orthogonalization of the PUCCH resources 620 across the two configured PUCCH resource lists may not be necessary.

The UE 115 may determine an available TTI 640 for at least one of the deferred HARQ feedback transmissions 615-c and 615-d based on the which corresponding PUCCH resource 620 fits in the TTI 640. In other words, the UE 115 may scan each subsequent TTI 640 for availability to fit a first PUCCH resource 620 selected for the HARQ feedback transmission 615-c and for availability to fit a second PUCCH resource 620 selected for the HARQ feedback transmission 615-d. The UE 115 will select the first TTI 640 that fits either of the first or second PUCCH resources 620 irrespective of the corresponding CORESET pool index value. A PUCCH resource 620 may be considered to fit in a TTI 640 if the PUCCH resource 620 does not overlap with downlink resources 630 in the TTI 640.

In the example of FIG. 6, the UE 115 may identify that the first PUCCH resource 620 for the HARQ feedback transmission 615-c fits in to the TTI 640-e. The UE 115 may transmit the HARQ feedback transmission 615-c accordingly. The UE 115 may also determine that the second PUCCH resource 620 for the HARQ feedback transmission 615-d also fits in the TTI 640-e (e.g., without overlapping with the first PUCCH resource 620 or downlink resources 630). As such, the UE 115 may transmit both of the HARQ feedback transmissions 615-c and 615-d in a same TTI 640. In some examples, however, the UE 115 may determine that the second PUCCH resource 620 for the HARQ feedback transmission 615-d does not fit in the TTI 640-e. The UE 115 may prioritize the HARQ feedback transmission 615-c that fits in the TTI 640-e, and the UE 115 will continue searching for another target TTI 640 for performing the deferred HARQ feedback transmission 615-d. In some examples, the UE 115 may defer the HARQ feedback transmission 615-d until the TTI 640-f, or another subsequent TTI 640.

The UE 115 may perform HARQ feedback deferral according to one or more of the described procedures if the UE 115 is configured with deferred HARQ feedback for SPS communications, if at least one serving cell for the UE 115 is configured with two or more CORESET pool index values, and if separate HARQ feedback is configured for the two or more COREST pool index values. In some examples, the HARQ feedback deferral may be configured separately for each CORESET pool index value. That is, the CORESET pool index value zero may be configured to support HARQ feedback deferral and the CORESET pool index value one may be not configured to support HARQ feedback deferral (e.g., HARQ feedback transmissions 615 associated with the CORESETPoolIndex value 1 may be dropped without deferral if overlap with downlink resources 630 occurs).

A UE 115 as described herein may thereby support HARQ feedback deferral for multiple SPS configurations 605 associated with two or more CORESET pools. The UE 115 may identify a next available TTI 640 for deferral of a HARQ feedback transmission 615 according to one or more procedures based on overlap between the initial HARQ feedback transmission 615 and one or more downlink resources 630. By deferring HARQ feedback transmissions 615 according to the described procedures, the UE 115 may reduce latency associated with the communications, improve communication reliability, and improve coordination between devices.

Figure 7:
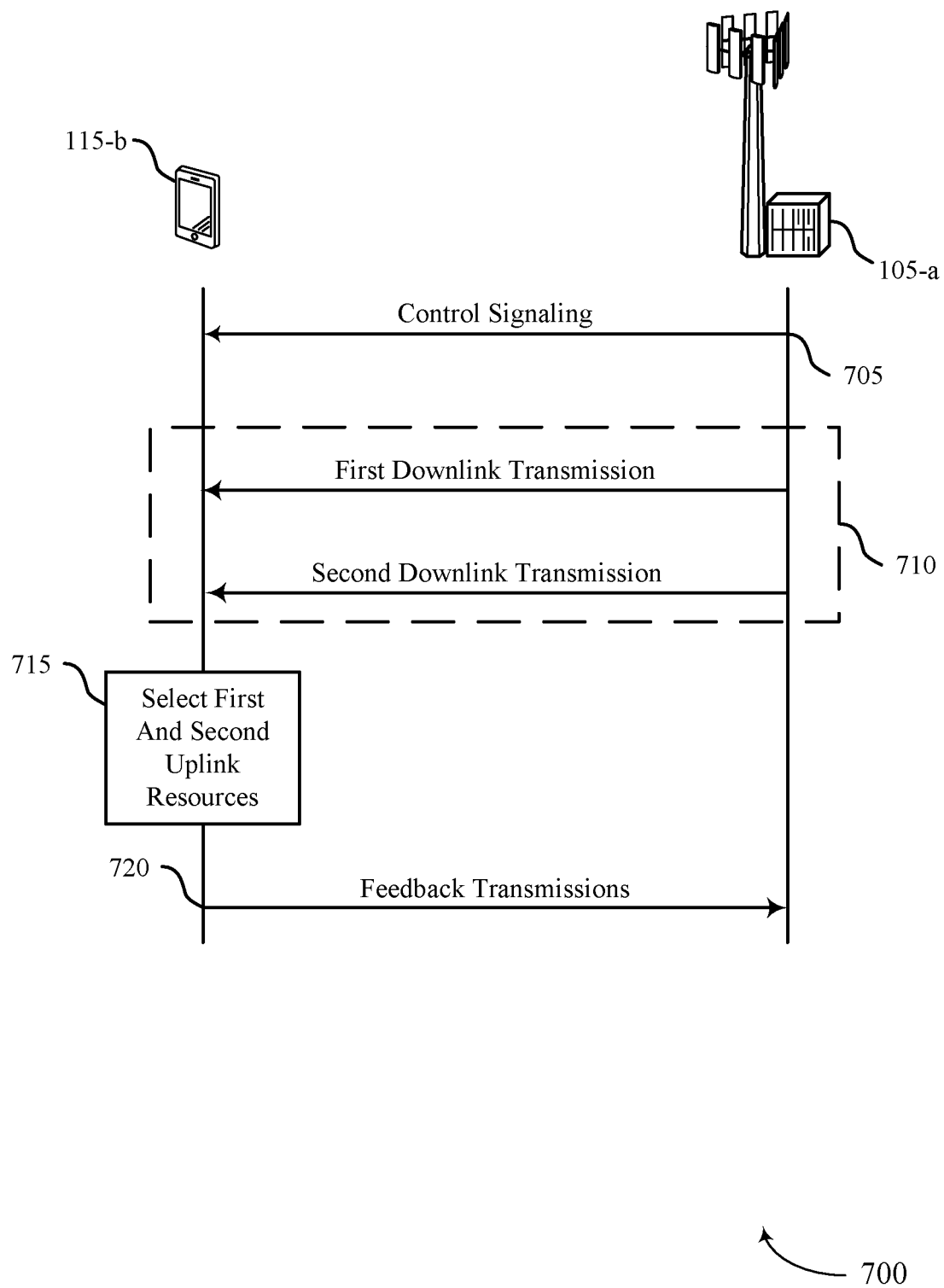
FIG. 7 illustrates an example of a process flow that supports separate feedback for SPS downlink wireless communications in accordance with aspects of the present disclosure.

FIG. 7 illustrates an example of a process flow 700 that supports separate feedback for SPS downlink wireless communications in accordance with aspects of the present disclosure. The process flow 700 may implement aspects of the wireless communications systems 100 and 200 or may be implemented by aspects of the wireless communications systems 100 and 200 as described with reference to FIGS. 1 and 2, respectively. For example, the process flow 700 may implement or be implemented by a base station 105-a and a UE 115-b, which may be examples of a base station 105 and UEs 115 as described with reference to FIGS. 1 through 6. In the following description of the process flow 700, the operations between the base station 105-a and the UE 115-b may be performed in different orders or at different times. Certain operations may also be left out of the process flow 700, or other operations may be added. Although the base station 105-a and the UE 115-b are shown performing the operations of the process flow 700, some aspects of some operations may also be performed by one or more other wireless devices.

In the example of FIG. 7, the UE 115-b may be configured with first and second subsets of uplink resources associated with first and second COREST pools, respectively. The UE 115-b may use the first and second subsets for performing HARQ feedback in response to SPS configurations for multi-DCI based multi-TRP communications. At 705, the UE 115-b may receive control signaling indicating a configuration of a set of uplink resources from the base station 105-a. The configured set of uplink resources may include a first subset of uplink resources associated with a first CORESET pool and a second subset of uplink resources associated with a second COREST pool.

At 710, the UE 115-b may receive a set of SPS downlink transmissions from the base station 105-a. The set of downlink transmissions may include a first downlink transmission associated with the first CORESET pool and a second downlink transmission associated with the second CORESET pool. In some examples, the UE 115-b may determine that the first and second downlink transmissions correspond to the first and second COREST pools, respectively based on a COREST in which a DCI scheduling the downlink transmissions is received, or based on an RRC configuration.

At 720, the UE 115-b may select a first uplink resource from the first subset of uplink resources and a second uplink resource from the second subset of uplink resources based on one or more of the first downlink transmission, the second downlink transmission, or a payload of a respective feedback transmission. At 725, the UE 115-b may transmit one or more feedback transmissions to the base station 105-b on one or more of the first uplink resource or the second uplink resource. In some examples, the UE 115-b may transmit a first feedback transmission on the first uplink resource and a second feedback transmission on the second resource based on the first uplink resource non-overlapping with the second uplink resource. In other examples, the UE 115-b may defer or drop transmission of one or both of the first feedback transmission or the second feedback transmission based on an overlap between the first uplink resource and the second uplink or between the first uplink resource, the second uplink resource, or both, and a downlink resource.

Figure 8:
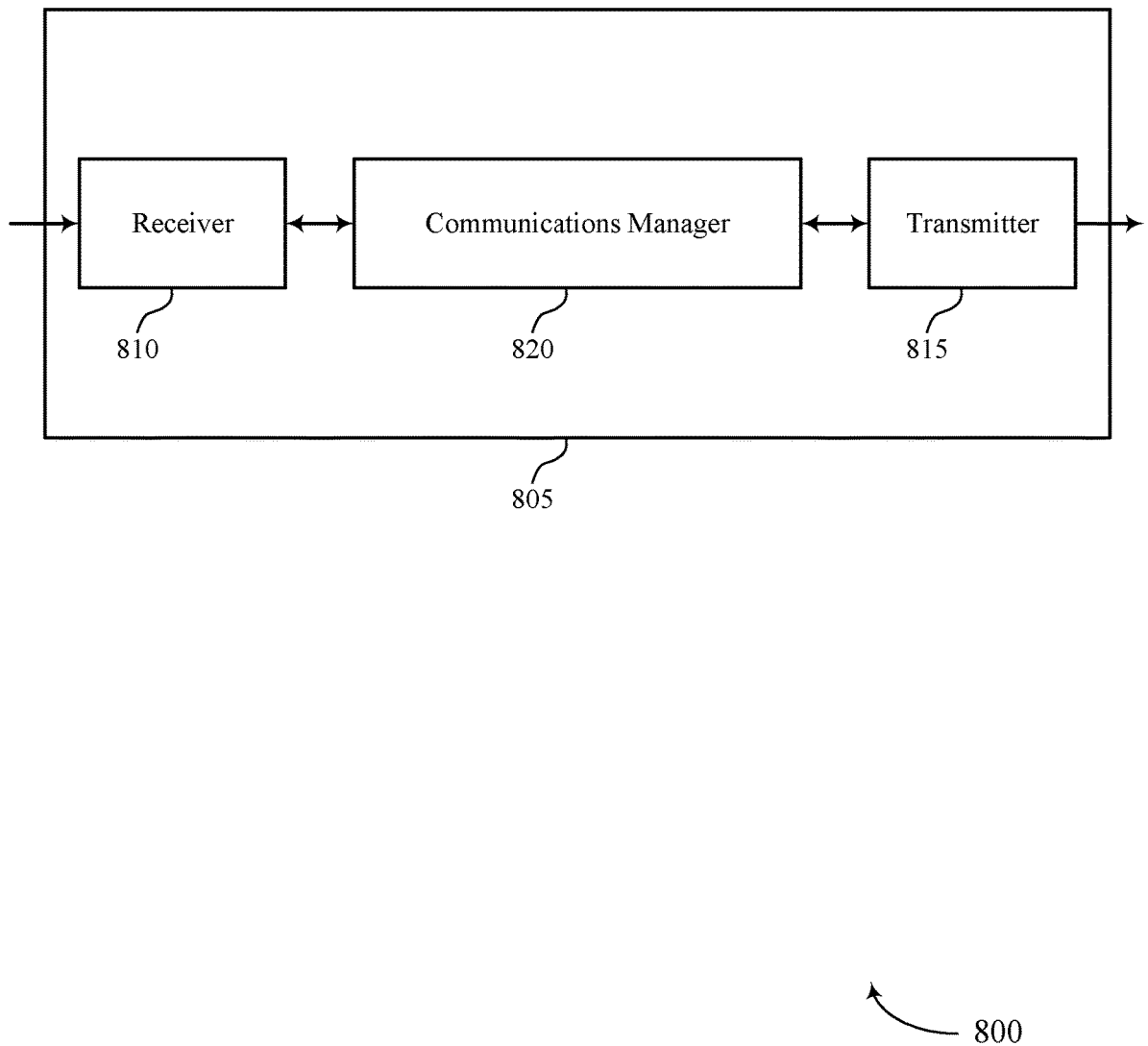
FIGS. 8 and 9 show block diagrams of devices that support separate feedback for SPS downlink wireless communications in accordance with aspects of the present disclosure.

FIG. 8 shows a block diagram 800 of a device 805 that supports separate feedback for SPS downlink wireless communications in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to separate feedback for SPS downlink wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to separate feedback for SPS downlink wireless communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of separate feedback for SPS downlink wireless communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at device 805 (e.g., a UE 115) in accordance with examples as disclosed herein. For example, the communications manager 820 may be configured as or otherwise support a means for receiving control signaling indicating a configuration of a set of uplink resources, the set of uplink resources including a first subset of uplink resources associated with a first CORESET pool and a second subset of uplink resources associated with a second CORESET pool. The communications manager 820 may be configured as or otherwise support a means for receiving a set of SPS downlink transmissions including a first downlink transmission associated with the first CORESET pool and a second downlink transmission associated with the second CORESET pool. The communications manager 820 may be configured as or otherwise support a means for selecting a first uplink resource from the first subset of uplink resources and a second uplink resource from the second subset of uplink resources based on one or more of the first downlink transmission, the second downlink transmission, or a payload of a respective feedback transmission. The communications manager 820 may be configured as or otherwise support a means for transmitting one or more feedback transmissions on one or more of the first uplink resource or the second uplink resource based at least in part on the selecting.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved communication reliability, reduced latency, and improved coordination between devices. The device 805 may be configured with first and second subsets of uplink resources to use for performing feedback transmissions in response to multiple SPS configurations. By selecting resources from each list, the device 805 may reduce potential for overlap between separate feedback transmissions, which may improve communication reliability. The reduced potential for overlap may additionally or alternatively reduce latency associated with communications by the device 805 due to fewer retransmissions. By using the configured subsets of resources and reducing overlap, the device 805 may improve coordination with other devices, such as a base station 105. That is, the device 805 may transmit more accurate and reliable HARQ feedback. Additionally or alternatively, the device 805 may utilize one or more configured processes for deferring a feedback transmission that collided with downlink resources. By deferring the feedback transmission, the device 805 may support reduced latency and improved communication reliability.

Figure 9:
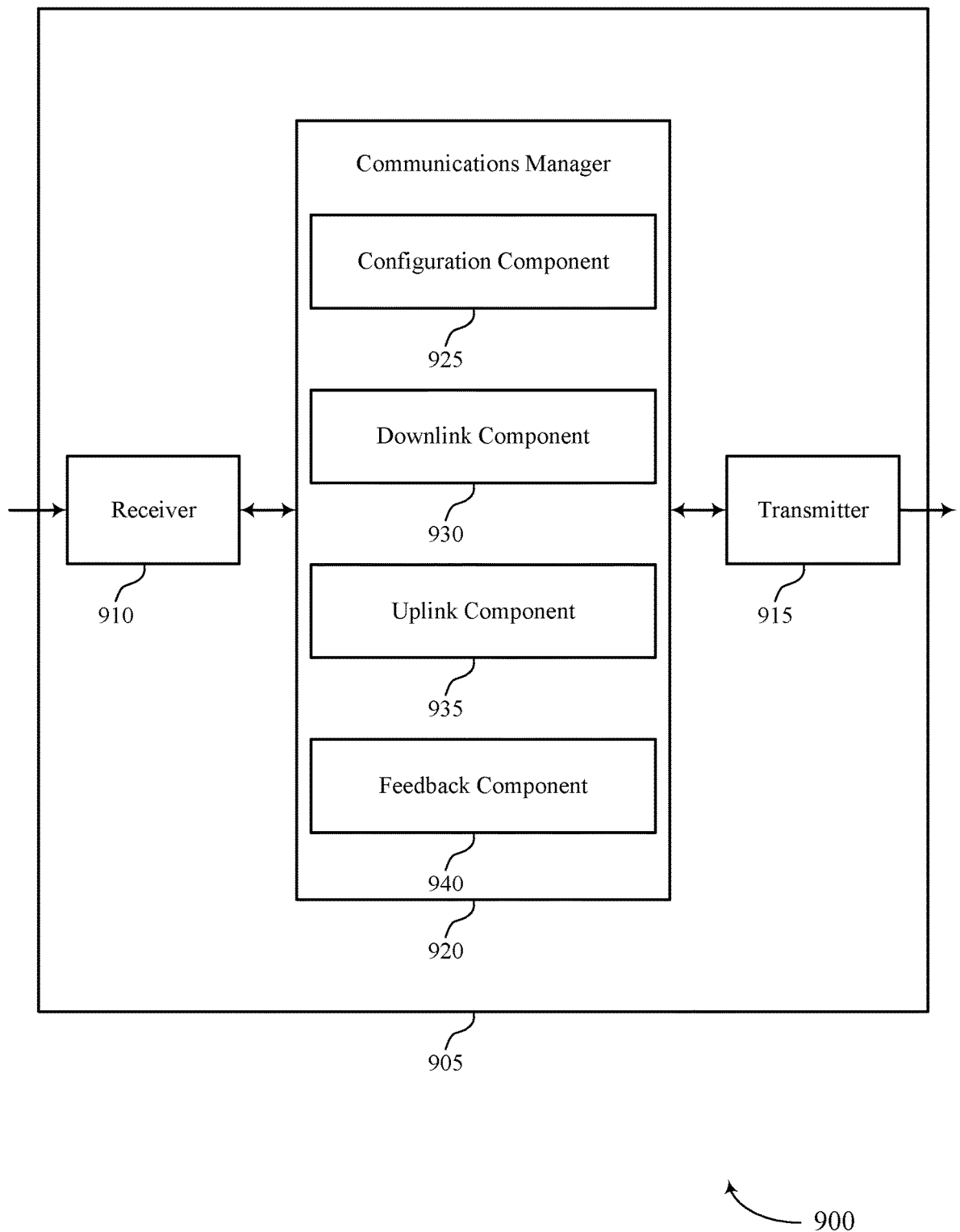

FIG. 9 shows a block diagram 900 of a device 905 that supports separate feedback for SPS downlink wireless communications in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to separate feedback for SPS downlink wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to separate feedback for SPS downlink wireless communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of separate feedback for SPS downlink wireless communications as described herein. For example, the communications manager 920 may include a configuration component 925, a downlink component 930, an uplink component 935, a feedback component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 (e.g., a UE 115) in accordance with examples as disclosed herein. The configuration component 925 may be configured as or otherwise support a means for receiving control signaling indicating a configuration of a set of uplink resources, the set of uplink resources including a first subset of uplink resources associated with a first CORESET pool and a second subset of uplink resources associated with a second CORESET pool. The downlink component 930 may be configured as or otherwise support a means for receiving a set of SPS downlink transmissions including a first downlink transmission associated with the first CORESET pool and a second downlink transmission associated with the second CORESET pool. The uplink component 935 may be configured as or otherwise support a means for selecting a first uplink resource from the first subset of uplink resources and a second uplink resource from the second subset of uplink resources based on one or more of the first downlink transmission, the second downlink transmission, or a payload of a respective feedback transmission. The feedback component 940 may be configured as or otherwise support a means for transmitting one or more feedback transmissions on one or more of the first uplink resource or the second uplink resource based at least in part on the selecting.

Figure 10:
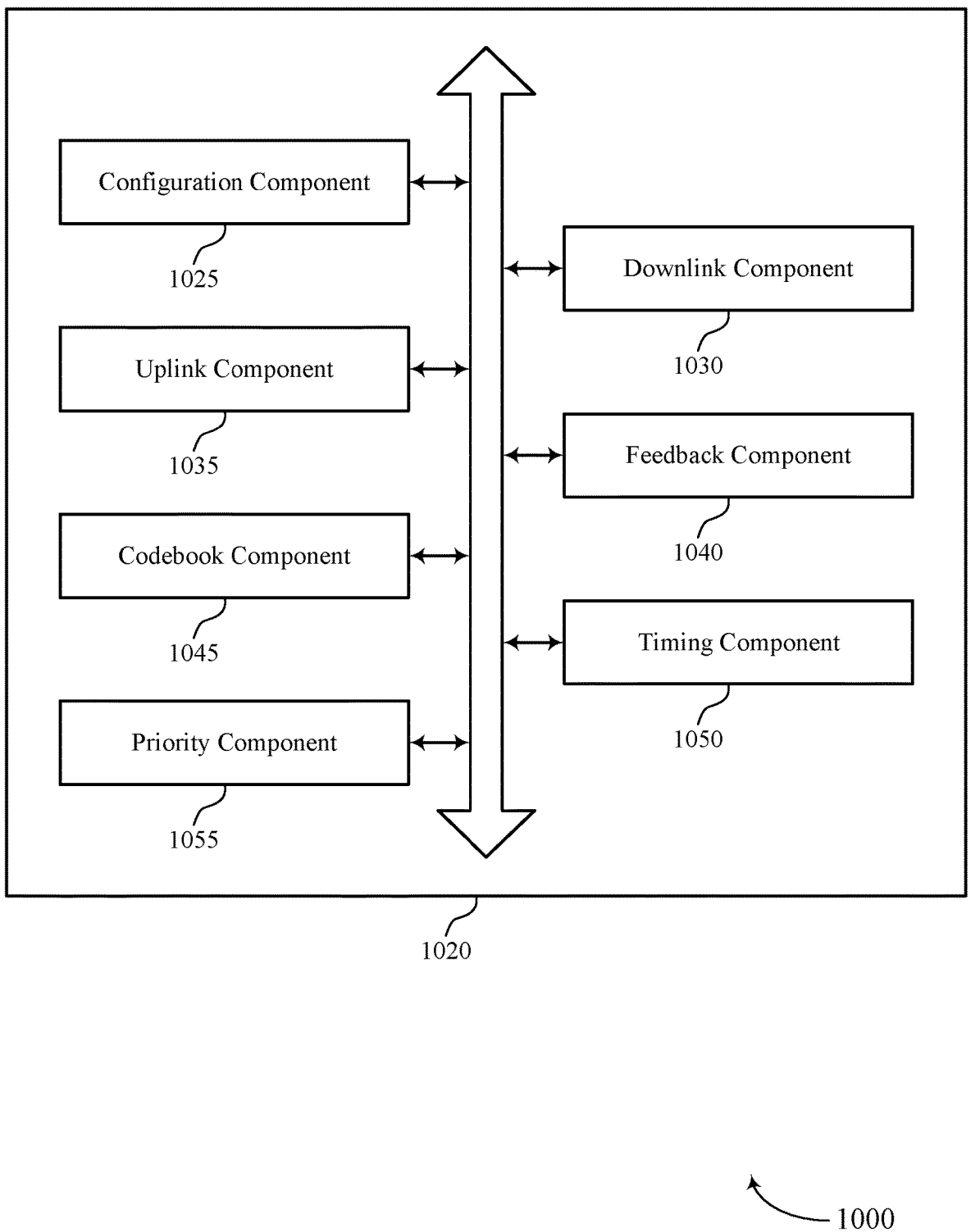
FIG. 10 shows a block diagram of a communications manager that supports separate feedback for SPS downlink wireless communications in accordance with aspects of the present disclosure.

FIG. 10 shows a block diagram 1000 of a communications manager 1020 that supports separate feedback for SPS downlink wireless communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of separate feedback for SPS downlink wireless communications as described herein. For example, the communications manager 1020 may include a configuration component 1025, a downlink component 1030, an uplink component 1035, a feedback component 1040, a codebook component 1045, a timing component 1050, a priority component 1055, or any combination thereof. Each of these components may communicate, directly or indirectly, with one another (e.g., via one or more buses).

The communications manager 1020 may support wireless communication at a UE in accordance with examples as disclosed herein. The configuration component 1025 may be configured as or otherwise support a means for receiving control signaling indicating a configuration of a set of uplink resources, the set of uplink resources including a first subset of uplink resources associated with a first CORESET pool and a second subset of uplink resources associated with a second CORESET pool. The downlink component 1030 may be configured as or otherwise support a means for receiving a set of SPS downlink transmissions including a first downlink transmission associated with the first CORESET pool and a second downlink transmission associated with the second CORESET pool. The uplink component 1035 may be configured as or otherwise support a means for selecting a first uplink resource from the first subset of uplink resources and a second uplink resource from the second subset of uplink resources based on one or more of the first downlink transmission, the second downlink transmission, or a payload of a respective feedback transmission. The feedback component 1040 may be configured as or otherwise support a means for transmitting one or more feedback transmissions on one or more of the first uplink resource or the second uplink resource based at least in part on the selecting.

In some examples, the uplink component 1035 may be configured as or otherwise support a means for determining that the first uplink resource from the first subset of uplink resources is non-overlapping with the second uplink resource from the second subset of uplink resources in a time domain based on the configuration of the set of uplink resources, where transmitting the one or more feedback transmissions includes. In some examples, the feedback component 1040 may be configured as or otherwise support a means for transmitting, in response to the first downlink transmission, a first feedback transmission on the first uplink resource based on the first uplink resource non-overlapping with the second uplink resource. In some examples, the feedback component 1040 may be configured as or otherwise support a means for transmitting, in response to the second downlink transmission, a second feedback transmission on the second uplink resource based on the second uplink resource non-overlapping with the first uplink resource.

In some examples, to support receiving the control signaling, the configuration component 1025 may be configured as or otherwise support a means for receiving an RRC configuration, the configuration indicating that each uplink resource associated with the first subset of uplink resources is non-overlapping with each uplink resource associated with the second subset of uplink resources in a time domain. In some examples, to support receiving the control signaling, the feedback component 1040 may be configured as or otherwise support a means for transmitting the one or more feedback transmissions based on that each uplink resource associated with the first subset of uplink resources non-overlapping with each uplink resource associated with the second subset of uplink resources in the time domain. In some examples, the first uplink resource from the first subset of uplink resources and associated with the first downlink transmission is non-overlapping with a third uplink resource, the first uplink resource is different from the third uplink resource, the first uplink resource including PUCCH resource and the third uplink resource including a PUSCH resource associated with the second CORESET pool.

In some examples, the uplink component 1035 may be configured as or otherwise support a means for determining that the first uplink resource from the first subset of uplink resources is overlapping with the second uplink resource from the second subset of uplink resources in a time domain based on the configuration of the set of uplink resources. In some examples, the feedback component 1040 may be configured as or otherwise support a means for transmitting, in response to the first downlink transmission, a first feedback transmission on the first uplink resource based on the first uplink resource overlapping with the second uplink resource. In some examples, the feedback component 1040 may be configured as or otherwise support a means for refraining from transmitting, in response to the second downlink transmission, a second feedback transmission on the second uplink resource based on the second uplink resource overlapping with the first uplink resource.

In some examples, the priority component 1055 may be configured as or otherwise support a means for determining a first priority of the first feedback transmission based on the first downlink transmission associated with the first CORESET pool and a second priority of the second feedback transmission based on the second downlink transmission associated with the second CORESET pool. In some examples, the feedback component 1040 may be configured as or otherwise support a means for transmitting the first feedback transmission and refraining from transmitting the second feedback transmission based on the first priority being higher than the second priority.

In some examples, the codebook component 1045 may be configured as or otherwise support a means for determining a set of codebooks based on the control signaling, the set of codebooks including a first codebook corresponding to a first priority and a second codebook corresponding to a second priority, the first subset of uplink resources associated with the first CORESET pool and the first priority, the second subset of uplink resources associated with the second CORESET pool and the first priority, a third subset of uplink resources associated with the first CORESET pool and the second priority, a fourth subset of uplink resources associated with the second CORESET pool and the second priority. In some examples, the feedback component 1040 may be configured as or otherwise support a means for transmitting the one or more feedback transmissions based on the set of codebooks.

In some examples, the timing component 1050 may be configured as or otherwise support a means for determining a subsequent TTI for transmitting the one or more feedback transmissions based on one or more of the first uplink resource or the second uplink resource overlapping with a downlink resource in a time domain during a current TTI. In some examples, the feedback component 1040 may be configured as or otherwise support a means for transmitting the one or more feedback transmissions based on determining the subsequent TTI for transmitting the one or more feedback transmissions.

In some examples, the uplink component 1035 may be configured as or otherwise support a means for selecting one or more of a third uplink resource from the first subset of uplink resources or a fourth uplink resource from the second subset of uplink resources based on a payload size of the one or more feedback transmissions and the first uplink resource or the second uplink resource overlapping with the downlink resource. In some examples, the feedback component 1040 may be configured as or otherwise support a means for transmitting the one or more feedback transmissions during the subsequent TTI and on one or more of the third uplink resource or the fourth uplink resource. In some examples, the timing component 1050 may be configured as or otherwise support a means for jointly determining the subsequent TTI for transmitting the one or more feedback transmissions based on a criterion and irrespective of one or more of the first CORESET pool or the second CORESET pool, the criterion including that the subsequent TTI includes an uplink resource, the uplink resource including an uplink symbol.

In some examples, the feedback component 1040 may be configured as or otherwise support a means for refraining from transmitting the one or more feedback transmissions during the subsequent TTI based on one or more of a third uplink resource from the first subset of uplink resources or a fourth uplink resource from the second subset of uplink resources overlapping with a second downlink resource in the time domain during the subsequent TTI. In some examples, the feedback component 1040 may be configured as or otherwise support a means for refraining from transmitting the one or more feedback transmissions occurs separately for a first feedback transmission associated with the first CORESET pool and a second feedback transmission associated with the second CORESET pool based on one or more of the third uplink resource from the first subset of uplink resources or the fourth uplink resource from the second subset of uplink resources overlapping with the second downlink resource in the time domain during the subsequent TTI.

In some examples, the timing component 1050 may be configured as or otherwise support a means for determining a subsequent TTI for each of the one or more feedback transmissions based on one or more of the first uplink resource or the second uplink resource overlapping with a downlink resource in the time domain during the current TTI. In some examples, the timing component 1050 may be configured as or otherwise support a means for determining that the subsequent TTI for each of the one or more feedback transmissions is the same. In some examples, the feedback component 1040 may be configured as or otherwise support a means for transmitting the one or more feedback transmissions during the subsequent TTI based on time division multiplexing the subsequent TTI for each of the one or more feedback transmissions.

In some examples, the timing component 1050 may be configured as or otherwise support a means for determining the subsequent TTI for transmitting the one or more feedback transmissions based on one or more of the first CORESET pool, the second CORESET pool, a codebook associated with the one or more feedback transmissions, or an uplink resource associated with the one or more feedback transmissions non-overlapping with a downlink resource associated with the subsequent TTI. In some examples, the timing component 1050 may be configured as or otherwise support a means for determining a first subsequent TTI for transmitting a first feedback transmission associated with the one or more feedback transmissions based on one or more of the first CORESET pool, or the first uplink resource overlapping with a downlink resource in a time domain during a current TTI. In some examples, the uplink component 1035 may be configured as or otherwise support a means for selecting a third uplink resource from the first subset of uplink resources based on a payload size of the first feedback transmission and the first uplink resource overlapping with the downlink resource. In some examples, the feedback component 1040 may be configured as or otherwise support a means for transmitting the first feedback transmission on the third uplink resource during the first subsequent TTI.

In some examples, the timing component 1050 may be configured as or otherwise support a means for determining the first subsequent TTI for transmitting a second feedback transmission associated with the one or more feedback transmissions based on one or more of the second CORESET pool, or the second uplink resource overlapping with the downlink resource in the time domain during the current TTI. In some examples, the uplink component 1035 may be configured as or otherwise support a means for selecting a fourth uplink resource from the second subset of uplink resources based on a payload size of the second feedback transmission and the second uplink resource overlapping with the downlink resource. In some examples, to support transmitting the one or more feedback transmissions, the feedback component 1040 may be configured as or otherwise support a means for transmitting the second feedback transmission on the fourth uplink resource during the first subsequent TTI based on the fourth uplink resource non-overlapping with the third uplink resource.

In some examples, the uplink component 1035 may be configured as or otherwise support a means for determining that the fourth uplink resource is overlapping with the third uplink resource during the first subsequent TTI. In some examples, the feedback component 1040 may be configured as or otherwise support a means for refraining from transmitting the second feedback transmission on the fourth uplink resource during the first subsequent TTI based on the fourth uplink resource overlapping with the third uplink resource. In some examples, the timing component 1050 may be configured as or otherwise support a means for determining a second subsequent TTI for transmitting the second feedback transmission associated with the one or more feedback transmissions based on the fourth uplink resource overlapping with the third uplink resource during the first subsequent TTI, where transmitting the one or more feedback transmissions includes. In some examples, the feedback component 1040 may be configured as or otherwise support a means for transmitting the second feedback transmission during the second subsequent TTI. In some examples, the first subset of uplink resources and the second subset of uplink resources correspond to separate feedback transmissions.

In some examples, the downlink component 1030 may be configured as or otherwise support a means for receiving a downlink control information message on a CORESET. In some examples, the downlink component 1030 may be configured as or otherwise support a means for determining that the CORESET corresponds to one or more of the first CORESET pool or the second CORESET pool. In some examples, the downlink component 1030 may be configured as or otherwise support a means for receiving the set of SPS downlink transmissions including the first downlink transmission associated with the first CORESET pool and the second downlink transmission associated with the second CORESET pool based on the determining that the CORESET corresponds to one or more of the first CORESET pool or the second CORESET pool. In some examples, the control signaling includes radio resource control signaling and the configuration includes a SPS configuration associated with the set of SPS downlink transmissions including the first downlink transmission associated with the first CORESET pool and the second downlink transmission associated with the second CORESET pool.

Figure 11:
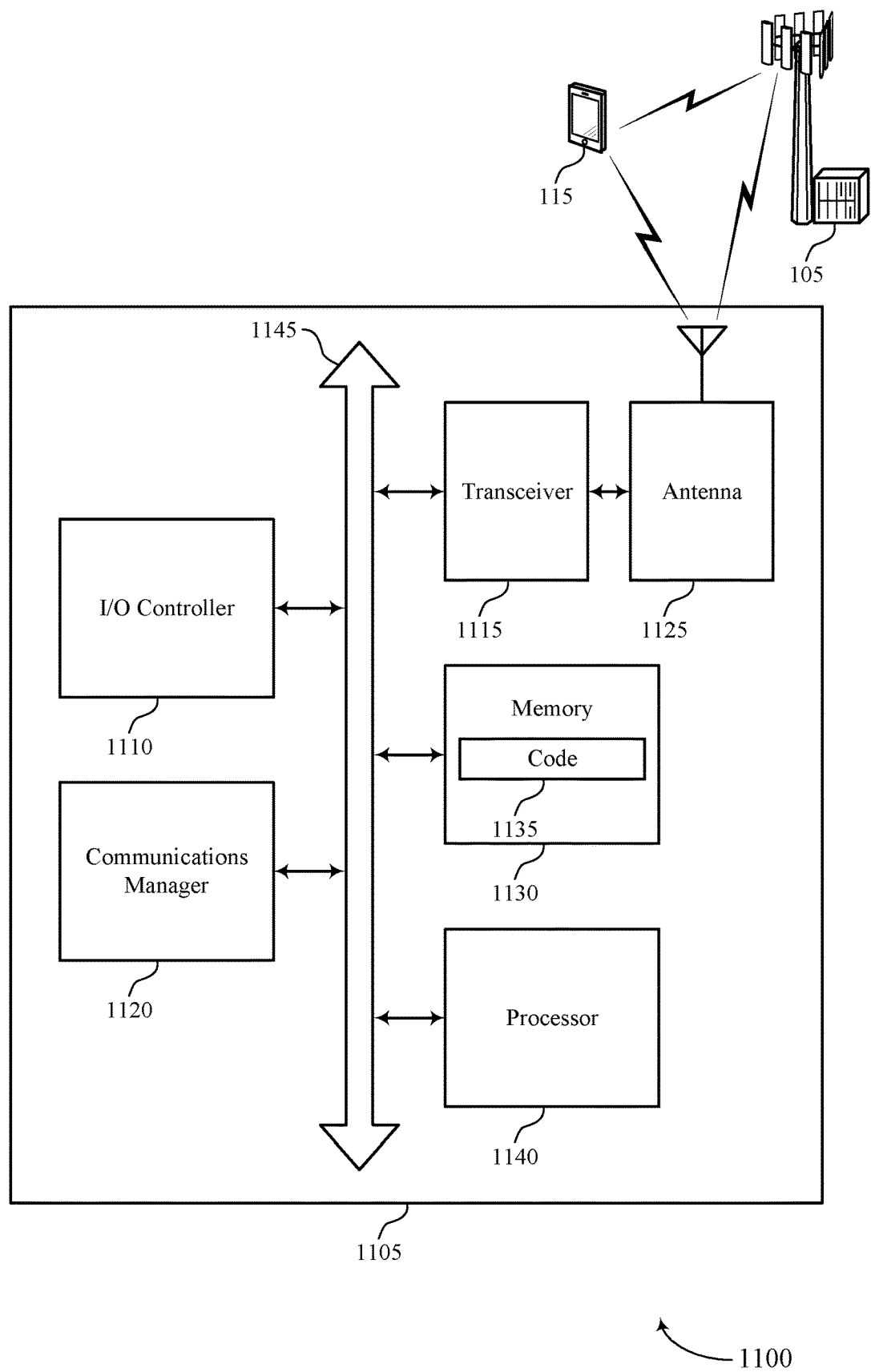
FIG. 11 shows a diagram of a system including a device that supports separate feedback for SPS downlink wireless communications in accordance with aspects of the present disclosure.

FIG. 11 shows a diagram of a system 1100 including a device 1105 that supports separate feedback for SPS downlink wireless communications in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting separate feedback for SPS downlink wireless communications). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at the device 1105 (e.g., a UE 115) in accordance with examples as disclosed herein. For example, the communications manager 1120 may be configured as or otherwise support a means for receiving control signaling indicating a configuration of a set of uplink resources, the set of uplink resources including a first subset of uplink resources associated with a first CORESET pool and a second subset of uplink resources associated with a second CORESET pool. The communications manager 1120 may be configured as or otherwise support a means for receiving a set of SPS downlink transmissions including a first downlink transmission associated with the first CORESET pool and a second downlink transmission associated with the second CORESET pool. The communications manager 1120 may be configured as or otherwise support a means for selecting a first uplink resource from the first subset of uplink resources and a second uplink resource from the second subset of uplink resources based on one or more of the first downlink transmission, the second downlink transmission, or a payload of a respective feedback transmission. The communications manager 1120 may be configured as or otherwise support a means for transmitting one or more feedback transmissions on one or more of the first uplink resource or the second uplink resource based at least in part on the selecting.

By including or configuring the communications manager 1120 in accordance with examples as described herein, the device 1105 may support techniques for improved communication reliability. The device 1105 may be configured with first and second subsets of uplink resources to use for performing feedback transmissions in response to multiple SPS configurations. By selecting resources from each list, the device 1105 may reduce potential for overlap between separate feedback transmissions, which may improve communication reliability. The reduced potential for overlap may additionally or alternatively reduce latency associated with communications by the device 1105 due to fewer retransmissions. By using the configured subsets of resources and reducing overlap, the device 1105 may improve coordination with other devices, such as a base station 105. That is, the device 805 may transmit more accurate and reliable HARQ feedback.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of separate feedback for SPS downlink wireless communications as described herein, or the processor 1140 and the memory 1130 may be otherwise configured to perform or support such operations.

Figure 12:
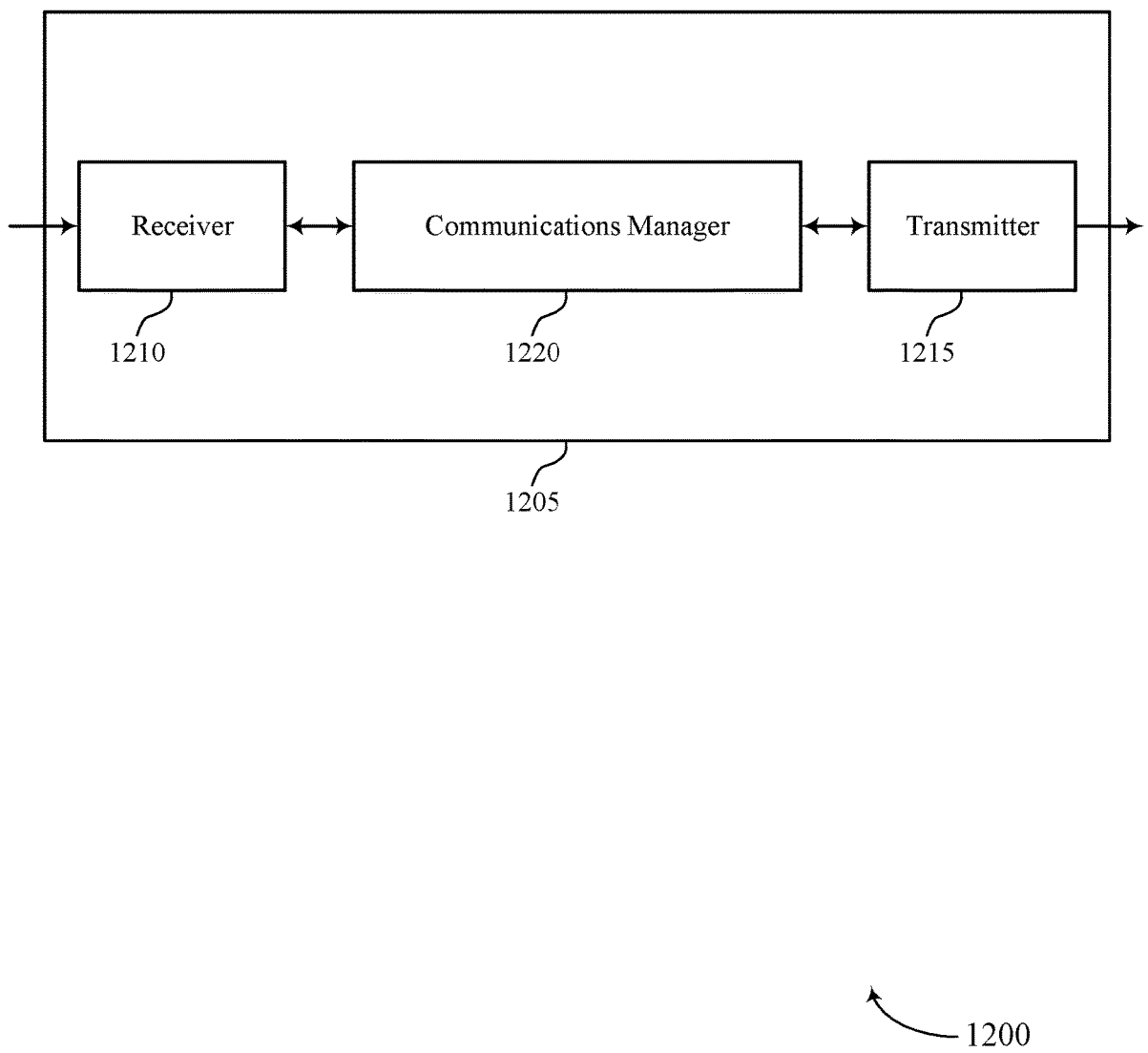
FIGS. 12 and 13 show block diagrams of devices that support separate feedback for SPS downlink wireless communications in accordance with aspects of the present disclosure.

FIG. 12 shows a block diagram 1200 of a device 1205 that supports separate feedback for SPS downlink wireless communications in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to separate feedback for SPS downlink wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to separate feedback for SPS downlink wireless communications). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of separate feedback for SPS downlink wireless communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at the device 1205 (e.g., a base station 105) in accordance with examples as disclosed herein. For example, the communications manager 1220 may be configured as or otherwise support a means for transmitting control signaling indicating a configuration of a set of uplink resources, the set of uplink resources including a first subset of uplink resources associated with a first CORESET pool and a second subset of uplink resources associated with a second CORESET pool. The communications manager 1220 may be configured as or otherwise support a means for transmitting a set of SPS downlink transmissions including a first downlink transmission associated with the first CORESET pool and a second downlink transmission associated with the second CORESET pool. The communications manager 1220 may be configured as or otherwise support a means for receiving one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources. By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reduced power consumption.

Figure 13:
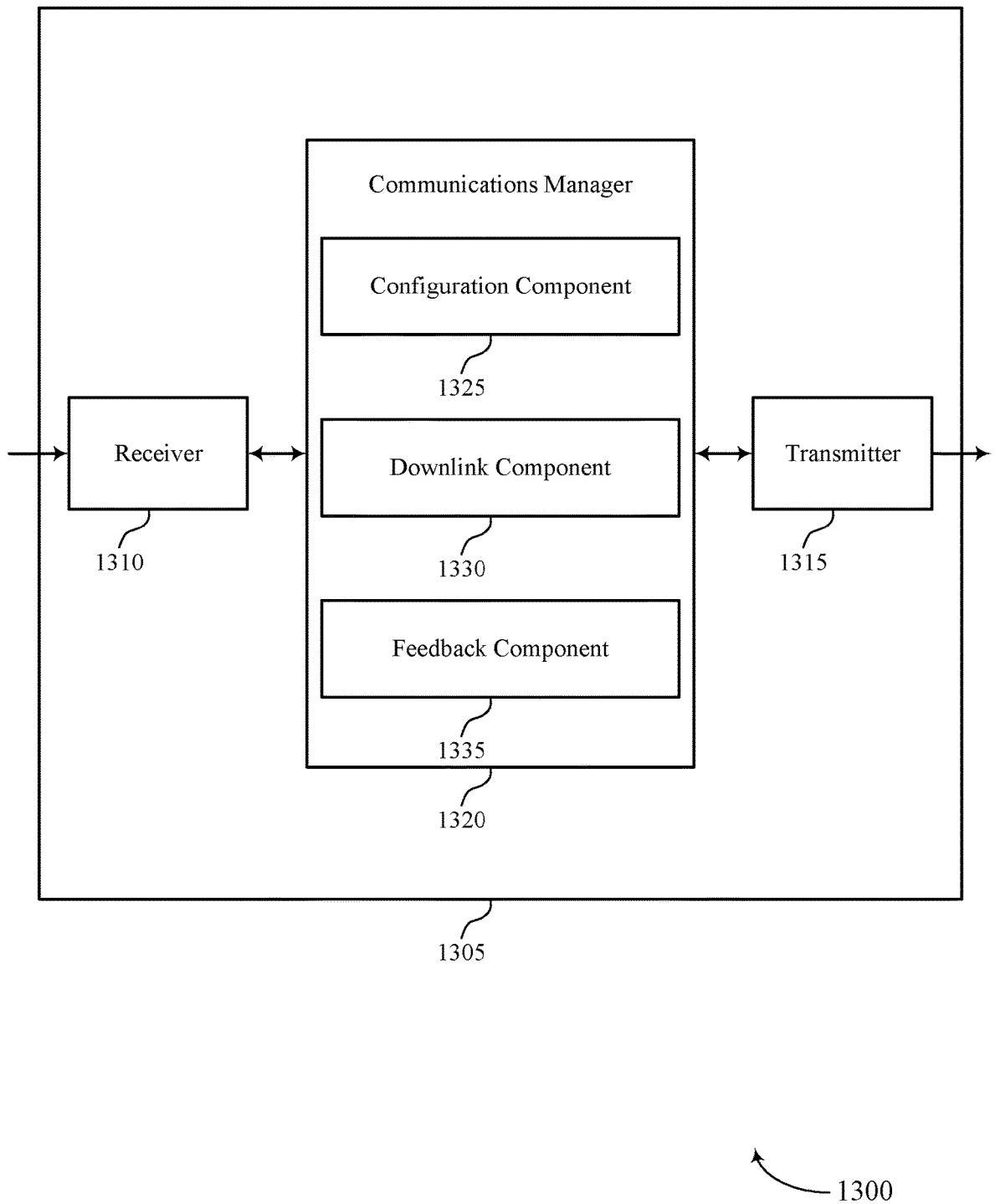

FIG. 13 shows a block diagram 1300 of a device 1305 that supports separate feedback for SPS downlink wireless communications in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to separate feedback for SPS downlink wireless communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to separate feedback for SPS downlink wireless communications). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of separate feedback for SPS downlink wireless communications as described herein. For example, the communications manager 1320 may include a configuration component 1325, a downlink component 1330, a feedback component 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at the device 1305 (e.g., a base station 105) in accordance with examples as disclosed herein. The configuration component 1325 may be configured as or otherwise support a means for transmitting control signaling indicating a configuration of a set of uplink resources, the set of uplink resources including a first subset of uplink resources associated with a first CORESET pool and a second subset of uplink resources associated with a second CORESET pool. The downlink component 1330 may be configured as or otherwise support a means for transmitting a set of SPS downlink transmissions including a first downlink transmission associated with the first CORESET pool and a second downlink transmission associated with the second CORESET pool. The feedback component 1335 may be configured as or otherwise support a means for receiving one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources.

Figure 14:
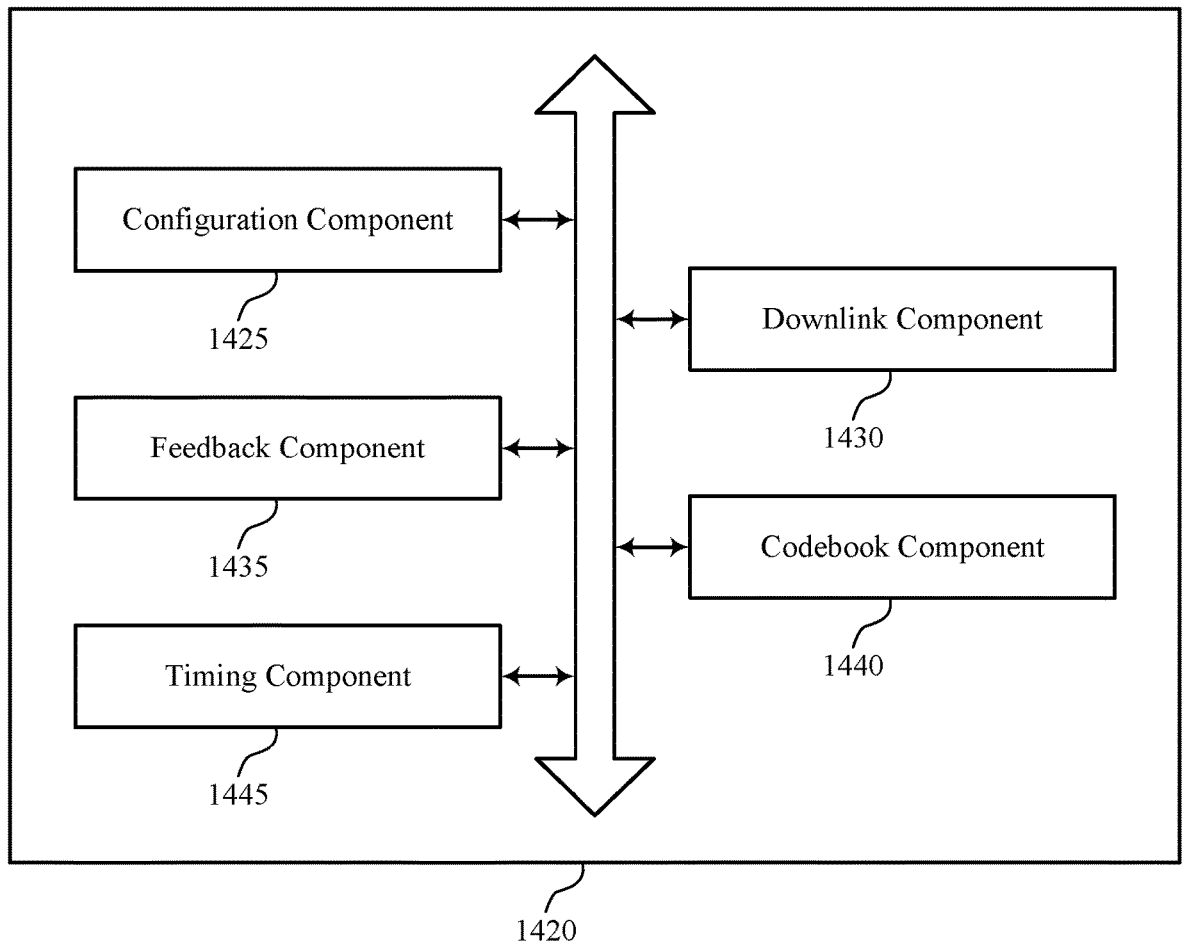
FIG. 14 shows a block diagram of a communications manager that supports separate feedback for SPS downlink wireless communications in accordance with aspects of the present disclosure.

FIG. 14 shows a block diagram 1400 of a communications manager 1420 that supports separate feedback for SPS downlink wireless communications in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of separate feedback for SPS downlink wireless communications as described herein. For example, the communications manager 1420 may include a configuration component 1425, a downlink component 1430, a feedback component 1435, a codebook component 1440, a timing component 1445, or any combination thereof. Each of these components may communicate, directly or indirectly, with one another (e.g., via one or more buses).

The communications manager 1420 may support wireless communication at a base station in accordance with examples as disclosed herein. The configuration component 1425 may be configured as or otherwise support a means for transmitting control signaling indicating a configuration of a set of uplink resources, the set of uplink resources including a first subset of uplink resources associated with a first CORESET pool and a second subset of uplink resources associated with a second CORESET pool. The downlink component 1430 may be configured as or otherwise support a means for transmitting a set of SPS downlink transmissions including a first downlink transmission associated with the first CORESET pool and a second downlink transmission associated with the second CORESET pool. The feedback component 1435 may be configured as or otherwise support a means for receiving one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources.

In some examples, to support receiving the one or more feedback transmissions, the feedback component 1435 may be configured as or otherwise support a means for receiving, in response to the first downlink transmission, a first feedback transmission on the first uplink resource based on the first uplink resource non-overlapping with the second uplink resource. In some examples, to support receiving the one or more feedback transmissions, the feedback component 1435 may be configured as or otherwise support a means for receiving, in response to the second downlink transmission, a second feedback transmission on the second uplink resource based on the second uplink resource non-overlapping with the first uplink resource.

In some examples, to support transmitting the control signaling, the configuration component 1425 may be configured as or otherwise support a means for transmitting an RRC configuration, the configuration indicating that each uplink resource associated with the first subset of uplink resources is non-overlapping with each uplink resource associated with the second subset of uplink resources in a time domain. In some examples, to support transmitting the control signaling, the feedback component 1435 may be configured as or otherwise support a means for receiving the one or more feedback transmissions based on that each uplink resource associated with the first subset of uplink resources non-overlapping with each uplink resource associated with the second subset of uplink resources in the time domain.

In some examples, the first uplink resource from the first subset of uplink resources and associated with the first downlink transmission is non-overlapping with a third uplink resource, the first uplink resource is different from the third uplink resource, the first uplink resource including a PUCCH resource and the third uplink resource including a PUSCH resource associated with the second CORESET pool. In some examples, to support receiving the one or more feedback transmissions, the feedback component 1435 may be configured as or otherwise support a means for receiving, in response to the first downlink transmission, a first feedback transmission on the first uplink resource based on the first uplink resource overlapping with the second uplink resource.

In some examples, the codebook component 1440 may be configured as or otherwise support a means for transmitting, via the control signaling, an indication of a set of codebooks including a first codebook corresponding to a first priority and a second codebook corresponding to a second priority, the first subset of uplink resources associated with the first CORESET pool and the first priority, the second subset of uplink resources associated with the second CORESET pool and the first priority, a third subset of uplink resources associated with the first CORESET pool and the second priority, a fourth subset of uplink resources associated with the second CORESET pool and the second priority. In some examples, the feedback component 1435 may be configured as or otherwise support a means for receiving the one or more feedback transmissions based on the set of codebooks.

In some examples, the timing component 1445 may be configured as or otherwise support a means for receiving the one or more feedback transmissions during a subsequent TTI and on one or more of a third uplink resource selected from the first subset of uplink resources or a fourth uplink resource selected from the second subset of uplink resources based on one or more of the first uplink resource or the second uplink resource overlapping with a downlink resource in a time domain during a current TTI.

Figure 15:
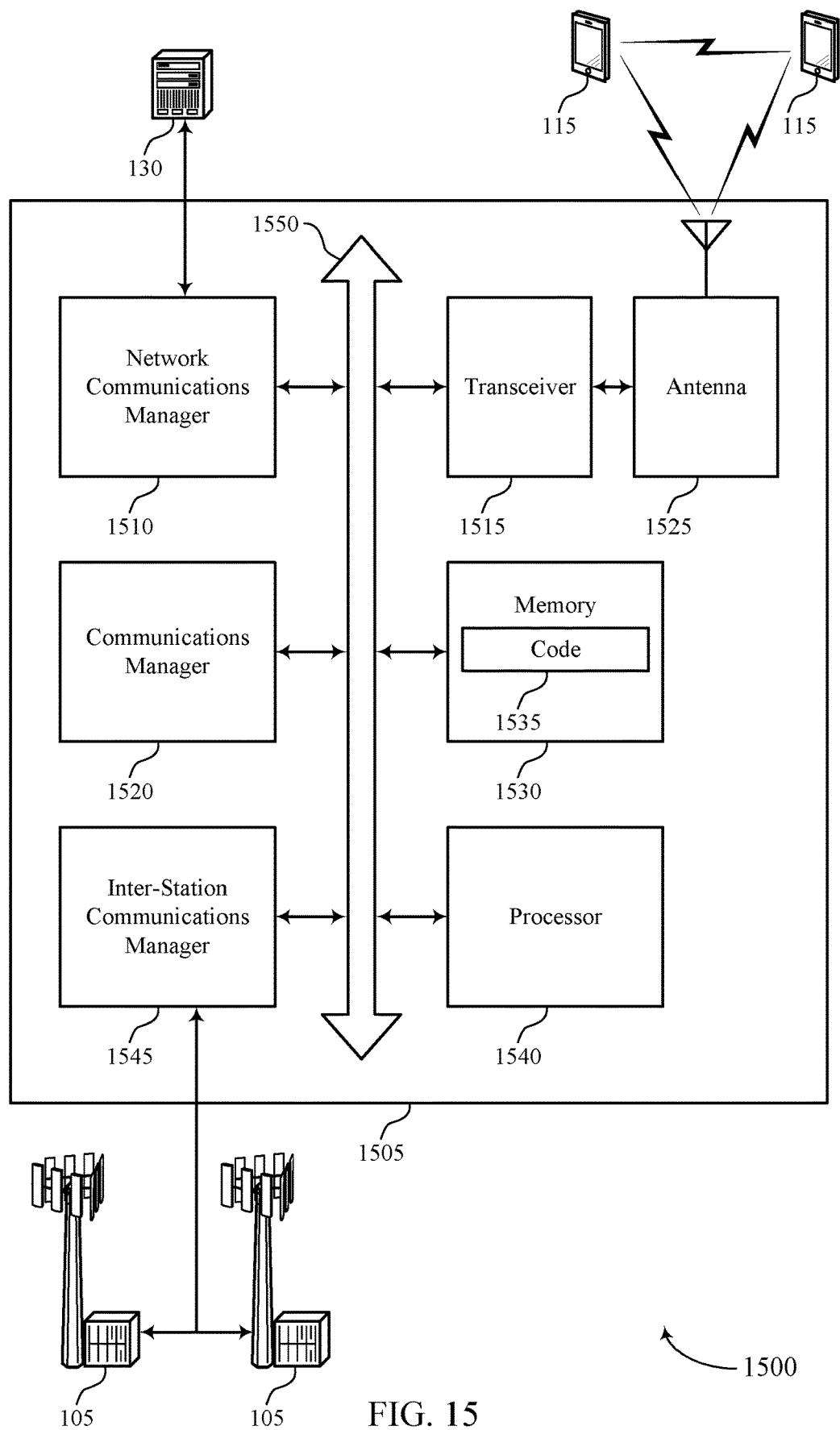
FIG. 15 shows a diagram of a system including a device that supports separate feedback for SPS downlink wireless communications in accordance with aspects of the present disclosure.

FIG. 15 shows a diagram of a system 1500 including a device 1505 that supports separate feedback for SPS downlink wireless communications in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting separate feedback for SPS downlink wireless communications). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at the device 1505 (e.g., a base station 105) in accordance with examples as disclosed herein. For example, the communications manager 1520 may be configured as or otherwise support a means for transmitting control signaling indicating a configuration of a set of uplink resources, the set of uplink resources including a first subset of uplink resources associated with a first CORESET pool and a second subset of uplink resources associated with a second CORESET pool. The communications manager 1520 may be configured as or otherwise support a means for transmitting a set of SPS downlink transmissions including a first downlink transmission associated with the first CORESET pool and a second downlink transmission associated with the second CORESET pool. The communications manager 1520 may be configured as or otherwise support a means for receiving one or more feedback transmissions on one or more of a first uplink resource or a second uplink resource based on one or more of the first downlink transmission or the second downlink transmission, where the first uplink resource is associated with the first subset of uplink resources and the second uplink resource is associated with the second subset of uplink resources. By including or configuring the communications manager 1520 in accordance with examples as described herein, the device 1505 may support techniques for improved communication reliability.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of separate feedback for SPS downlink wireless communications as described herein, or the processor 1540 and the memory 1530 may be otherwise configured to perform or support such operations.

Figure 16:
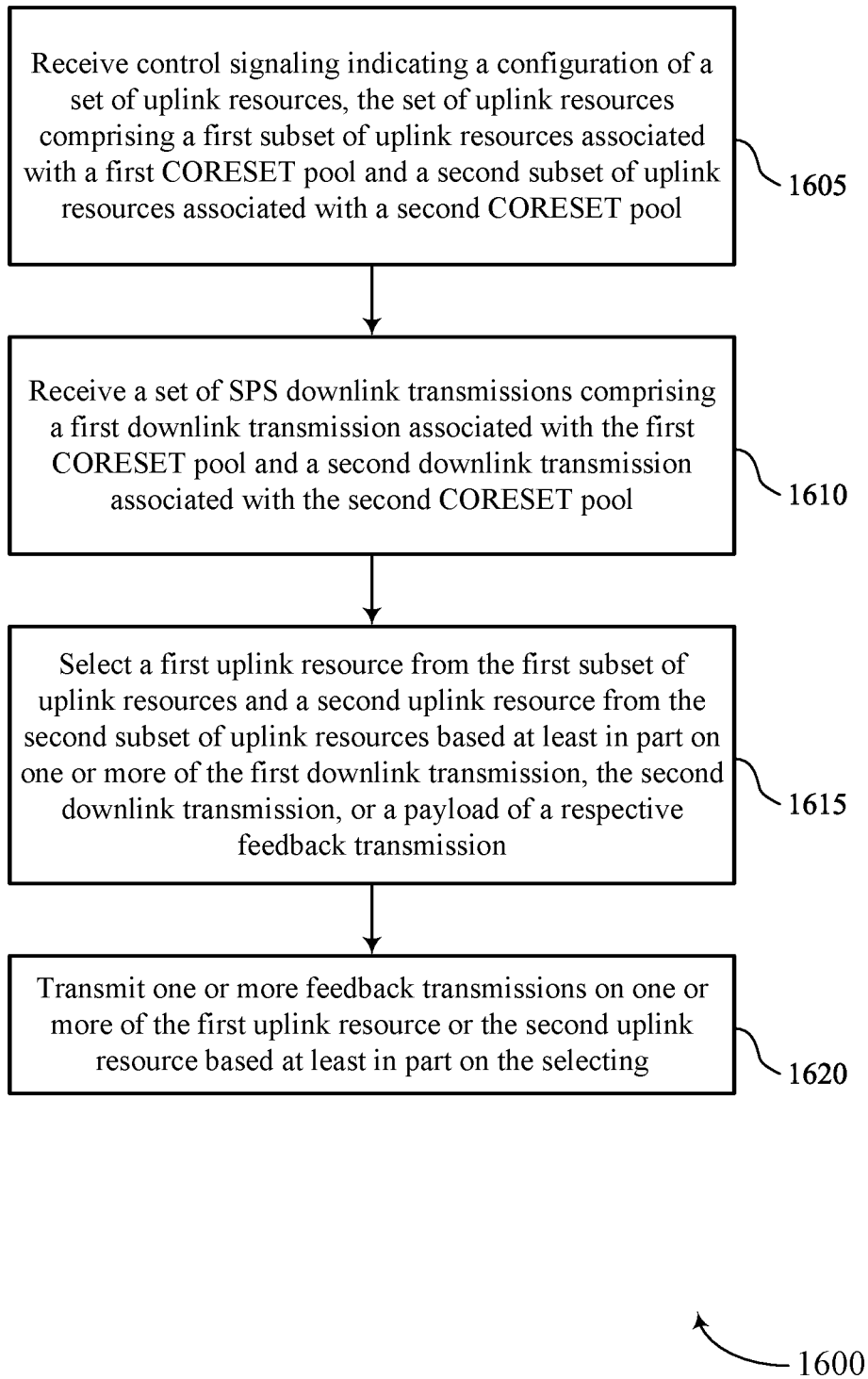
FIGS. 16 and 17 show flowcharts illustrating methods that support separate feedback for SPS downlink wireless communications in accordance with aspects of the present disclosure.

FIG. 16 shows a flowchart illustrating a method 1600 that supports separate feedback for SPS downlink wireless communications in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a configuration of a set of uplink resources, the set of uplink resources comprising a first subset of uplink resources associated with a first CORESET pool and a second subset of uplink resources associated with a second CORESET pool. The operations of 1605 may be performed in accordance with examples as disclosed herein. In some examples, aspects of the operations of 1605 may be performed by a configuration component 1025 as described with reference to FIG. 10.

At 1610, the method may include receiving a set of SPS downlink transmissions comprising a first downlink transmission associated with the first CORESET pool and a second downlink transmission associated with the second CORESET pool. The operations of 1610 may be performed in accordance with examples as disclosed herein. In some examples, aspects of the operations of 1610 may be performed by a downlink component 1030 as described with reference to FIG. 10.

At 1615, the method may include selecting a first uplink resource from the first subset of uplink resources and a second uplink resource from the second subset of uplink resources based at least in part on one or more of the first downlink transmission, the second downlink transmission, or a payload of a respective feedback transmission. The operations of 1615 may be performed in accordance with examples as disclosed herein. In some examples, aspects of the operations of 1615 may be performed by an uplink component 1035 as described with reference to FIG. 10.

At 1620, the method may include transmitting one or more feedback transmissions on one or more of the first uplink resource or the second uplink resource based at least in part on the selecting. The operations of 1620 may be performed in accordance with examples as disclosed herein. In some examples, aspects of the operations of 1620 may be performed by a feedback component 1040 as described with reference to FIG. 10.

Figure 17:
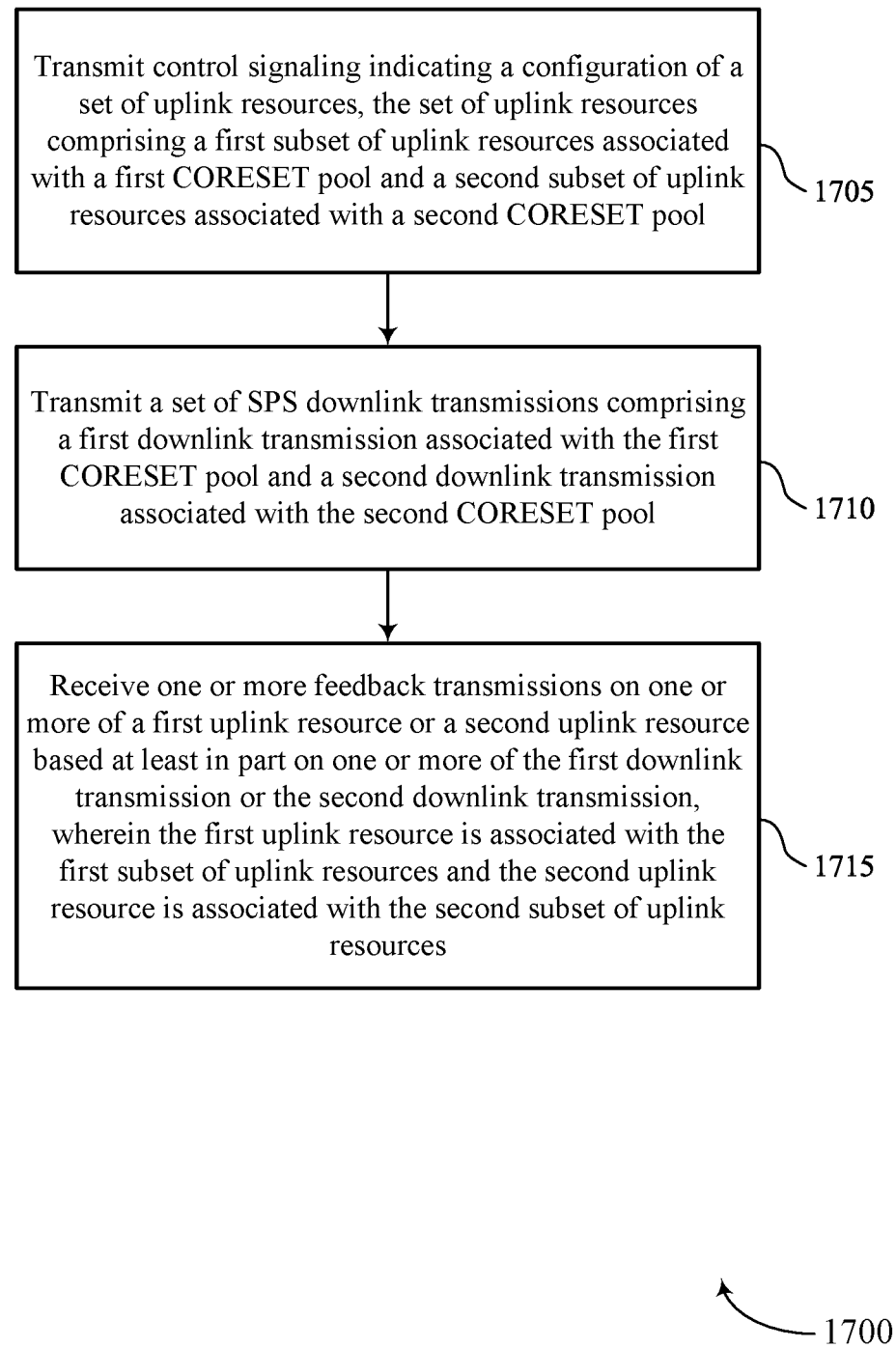

FIG. 17 shows a flowchart illustrating a method 1700 that supports separate feedback for SPS downlink wireless communications in accordance with aspects of the present disclosure. The operations of the method 1700 may be implemented by a base station or its components as described herein. For example, the operations of the method 1700 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1705, the method may include transmitting control signaling indicating a configuration of a set of uplink resources, the set of uplink resources comprising a first subset of uplink resources associated with a first CORESET pool and a second subset of uplink resources associated with a second CORESET pool. The operations of 1705 may be performed in accordance with examples as disclosed herein. In some examples, aspects of the operations of 1705 may be performed by a configuration component 1425 as described with reference to FIG. 14.

At 1710, the method may include transmitting a set of SPS downlink transmissions comprising a first downlink transmission associated with the first CORESET pool and a second downlink transmission associated with the second CORESET pool. The operations of 1710 may be performed in accordance with examples as disclosed herein. In some examples, aspects of the operations of 1710 may be performed by a downlink component 1430 as described with reference to FIG. 14.

At 1715, the method may include receiving one or more feedback transmissions on one or more of a first uplink resource or a second uplink resource based at least in part on one or more of the first downlink transmission or the second downlink transmission, wherein the first uplink resource is associated with the first subset of uplink resources and the second uplink resource is associated with the second subset of uplink resources. The operations of 1715 may be performed in accordance with examples as disclosed herein. In some examples, aspects of the operations of 1715 may be performed by a feedback component 1435 as described with reference to FIG. 14.

The following provides an overview of aspects of the present disclosure:

Aspect 1: A method for wireless communication at a UE, comprising: receiving control signaling indicating a configuration of a set of uplink resources, the set of uplink resources comprising a first subset of uplink resources associated with a first CORESET pool and a second subset of uplink resources associated with a second CORESET pool; receiving a set of SPS downlink transmissions comprising a first downlink transmission associated with the first CORESET pool and a second downlink transmission associated with the second CORESET pool; selecting a first uplink resource from the first subset of uplink resources and a second uplink resource from the second subset of uplink resources based at least in part on one or more of the first downlink transmission, the second downlink transmission, or a payload of a respective feedback transmission; and transmitting one or more feedback transmissions on one or more of the first uplink resource or the second uplink resource based at least in part on the selecting.

Aspect 2: The method of aspect 1, further comprising: determining that the first uplink resource from the first subset of uplink resources is non-overlapping with the second uplink resource from the second subset of uplink resources in a time domain based at least in part on the configuration of the set of uplink resources, wherein transmitting the one or more feedback transmissions comprises: transmitting, in response to the first downlink transmission, a first feedback transmission on the first uplink resource based at least in part on the first uplink resource non-overlapping with the second uplink resource; and transmitting, in response to the second downlink transmission, a second feedback transmission on the second uplink resource based at least in part on the second uplink resource non-overlapping with the first uplink resource.

Aspect 3: The method of any of aspects 1 through 2, wherein receiving the control signaling comprises: receiving an RRC configuration, the configuration indicating that each uplink resource associated with the first subset of uplink resources is non-overlapping with each uplink resource associated with the second subset of uplink resources in a time domain, wherein transmitting the one or more feedback transmissions is based at least in part on that each uplink resource associated with the first subset of uplink resources is non-overlapping with each uplink resource associated with the second subset of uplink resources in the time domain.

Aspect 4: The method of any of aspects 1 through 3, wherein the first uplink resource from the first subset of uplink resources and associated with the first downlink transmission is non-overlapping with a third uplink resource, the first uplink resource is different from the third uplink resource, the first uplink resource comprising a PUCCH resource and the third uplink resource comprising a PUSCH resource associated with the second CORESET pool.

Aspect 5: The method of aspect 1, further comprising: determining that the first uplink resource from the first subset of uplink resources is overlapping with the second uplink resource from the second subset of uplink resources in a time domain based at least in part on the configuration of the set of uplink resources, wherein transmitting the one or more feedback transmissions comprises: transmitting, in response to the first downlink transmission, a first feedback transmission on the first uplink resource based at least in part on the first uplink resource overlapping with the second uplink resource; and refraining from transmitting, in response to the second downlink transmission, a second feedback transmission on the second uplink resource based at least in part on the second uplink resource overlapping with the first uplink resource.

Aspect 6: The method of aspect 5, further comprising: determining a first priority of the first feedback transmission based at least in part on the first downlink transmission associated with the first CORESET pool and a second priority of the second feedback transmission based at least in part on the second downlink transmission associated with the second CORESET pool, wherein transmitting the first feedback transmission and refraining from transmitting the second feedback transmission is based at least in part on the first priority being higher than the second priority.

Aspect 7: The method of any of aspects 1 through 6, further comprising: determining a set of codebooks based at least in part on the control signaling, the set of codebooks comprising a first codebook corresponding to a first priority and a second codebook corresponding to a second priority, the first subset of uplink resources associated with the first CORESET pool and the first priority, the second subset of uplink resources associated with the second CORESET pool and the first priority, a third subset of uplink resources associated with the first CORESET pool and the second priority, a fourth subset of uplink resources associated with the second CORESET pool and the second priority, wherein transmitting the one or more feedback transmissions is based at least in part on the set of codebooks.

Aspect 8: The method of any of aspects 1 through 7, further comprising: determining a subsequent TTI for transmitting the one or more feedback transmissions based at least in part on one or more of the first uplink resource or the second uplink resource overlapping with a downlink resource in a time domain during a current TTI, wherein transmitting the one or more feedback transmissions comprises: transmitting the one or more feedback transmissions based at least in part on determining the subsequent TTI for transmitting the one or more feedback transmissions.

Aspect 9: The method of aspect 8, further comprising: selecting one or more of a third uplink resource from the first subset of uplink resources or a fourth uplink resource from the second subset of uplink resources based at least in part on a payload size of the one or more feedback transmissions and the first uplink resource or the second uplink resource overlapping with the downlink resource, wherein transmitting the one or more feedback transmissions comprises: transmitting the one or more feedback transmissions during the subsequent TTI and on one or more of the third uplink resource or the fourth uplink resource.

Aspect 10: The method of any of aspects 8 through 9, further comprising: jointly determining the subsequent TTI for transmitting the one or more feedback transmissions based at least in part on a criterion and irrespective of one or more of the first CORESET pool or the second CORESET pool, the criterion comprising that the subsequent TTI comprises an uplink resource, the uplink resource including an uplink symbol.

Aspect 11: The method of any of aspects 8 through 10, further comprising: refraining from transmitting the one or more feedback transmissions during the subsequent TTI based at least in part on one or more of a third uplink resource from the first subset of uplink resources or a fourth uplink resource from the second subset of uplink resources overlapping with a second downlink resource in the time domain during the subsequent TTI, wherein refraining from transmitting the one or more feedback transmissions occurs separately for a first feedback transmission associated with the first CORESET pool and a second feedback transmission associated with the second CORESET pool based at least in part on one or more of the third uplink resource from the first subset of uplink resources or the fourth uplink resource from the second subset of uplink resources overlapping with the second downlink resource in the time domain during the subsequent TTI.

Aspect 12: The method of any of aspects 8 through 9, further comprising: determining a subsequent TTI for each of the one or more feedback transmissions based at least in part on one or more of the first uplink resource or the second uplink resource overlapping with a downlink resource in the time domain during the current TTI; and determining that the subsequent TTI for each of the one or more feedback transmissions is the same, wherein transmitting the one or more feedback transmissions comprises: transmitting the one or more feedback transmissions during the subsequent TTI based at least in part on time division multiplexing the subsequent TTI for each of the one or more feedback transmissions.

Aspect 13: The method of any of aspects 8 through 9, further comprising: determining the subsequent TTI for transmitting the one or more feedback transmissions based at least in part on one or more of the first CORESET pool, the second CORESET pool, a codebook associated with the one or more feedback transmissions, or an uplink resource associated with the one or more feedback transmissions non-overlapping with a downlink resource associated with the subsequent TTI.

Aspect 14: The method of any of aspects 1 through 9, further comprising: determining a first subsequent TTI for transmitting a first feedback transmission associated with the one or more feedback transmissions based at least in part on one or more of the first CORESET pool, or the first uplink resource overlapping with a downlink resource in a time domain during a current TTI; selecting a third uplink resource from the first subset of uplink resources based at least in part on a payload size of the first feedback transmission and the first uplink resource overlapping with the downlink resource, wherein transmitting the one or more feedback transmissions comprises: transmitting the first feedback transmission on the third uplink resource during the first subsequent TTI.

Aspect 15: The method of aspect 14, further comprising: determining the first subsequent TTI for transmitting a second feedback transmission associated with the one or more feedback transmissions based at least in part on one or more of the second CORESET pool, or the second uplink resource overlapping with the downlink resource in the time domain during the current TTI; and selecting a fourth uplink resource from the second subset of uplink resources based at least in part on a payload size of the second feedback transmission and the second uplink resource overlapping with the downlink resource.

Aspect 16: The method of aspect 15, wherein transmitting the one or more feedback transmissions comprises: transmitting the second feedback transmission on the fourth uplink resource during the first subsequent TTI based at least in part on the fourth uplink resource non-overlapping with the third uplink resource.

Aspect 17: The method of aspect 15, further comprising: determining that the fourth uplink resource is overlapping with the third uplink resource during the first subsequent TTI; and refraining from transmitting the second feedback transmission on the fourth uplink resource during the first subsequent TTI based at least in part on the fourth uplink resource overlapping with the third uplink resource.

Aspect 18: The method of aspect 17, further comprising: determining a second subsequent TTI for transmitting the second feedback transmission associated with the one or more feedback transmissions based at least in part on the fourth uplink resource overlapping with the third uplink resource during the first subsequent TTI, wherein transmitting the one or more feedback transmissions comprises: transmitting the second feedback transmission during the second subsequent TTI.

Aspect 19: The method of any of aspects 1 through 18, wherein the first subset of uplink resources and the second subset of uplink resources correspond to separate feedback transmissions.

Aspect 20: The method of any of aspects 1 through 19, further comprising: receiving a DCI message on a CORESET; and determining that the CORESET corresponds to one or more of the first CORESET pool or the second CORESET pool, wherein receiving the set of SPS downlink transmissions comprising the first downlink transmission associated with the first CORESET pool and the second downlink transmission associated with the second CORESET pool is based at least in part on the determining that the CORESET corresponds to one or more of the first CORESET pool or the second CORESET pool.

Aspect 21: The method of any of aspects 1 through 20, wherein the control signaling comprises RRC signaling and the configuration comprises an SPS configuration associated with the set of SPS downlink transmissions comprising the first downlink transmission associated with the first CORESET pool and the second downlink transmission associated with the second CORESET pool.

Aspect 22: A method for wireless communication at a base station, comprising: transmitting control signaling indicating a configuration of a set of uplink resources, the set of uplink resources comprising a first subset of uplink resources associated with a first CORESET pool and a second subset of uplink resources associated with a second CORESET pool; transmitting a set of SPS downlink transmissions comprising a first downlink transmission associated with the first CORESET pool and a second downlink transmission associated with the second CORESET pool; and receiving one or more feedback transmissions on one or more of a first uplink resource or a second uplink resource based at least in part on one or more of the first downlink transmission or the second downlink transmission, wherein the first uplink resource is associated with the first subset of uplink resources and the second uplink resource is associated with the second subset of uplink resources.

Aspect 23: The method of aspect 22, wherein the first uplink resource from the first subset of uplink resources is non-overlapping with the second uplink resource from the second subset of uplink resources in a time domain, and wherein receiving the one or more feedback transmissions comprises: receiving, in response to the first downlink transmission, a first feedback transmission on the first uplink resource based at least in part on the first uplink resource non-overlapping with the second uplink resource; and receiving, in response to the second downlink transmission, a second feedback transmission on the second uplink resource based at least in part on the second uplink resource non-overlapping with the first uplink resource.

Aspect 24: The method of any of aspects 22 through 23, wherein transmitting the control signaling comprises: transmitting an RRC configuration, the configuration indicating that each uplink resource associated with the first subset of uplink resources is non-overlapping with each uplink resource associated with the second subset of uplink resources in a time domain, wherein receiving the one or more feedback transmissions is based at least in part on that each uplink resource associated with the first subset of uplink resources is non-overlapping with each uplink resource associated with the second subset of uplink resources in the time domain.

Aspect 25: The method of any of aspects 22 through 24, wherein the first uplink resource from the first subset of uplink resources and associated with the first downlink transmission is non-overlapping with a third uplink resource, the first uplink resource is different from the third uplink resource, the first uplink resource comprising a PUCCH resource and the third uplink resource comprising a PUSCH resource associated with the second CORESET pool.

Aspect 26: The method of aspect 22, wherein the first uplink resource from the first subset of uplink resources is overlapping with the second uplink resource from the second subset of uplink resources in a time domain based at least in part on the configuration of the set of uplink resources, wherein receiving the one or more feedback transmissions comprises: receiving, in response to the first downlink transmission, a first feedback transmission on the first uplink resource based at least in part on the first uplink resource overlapping with the second uplink resource.

Aspect 27: The method of any of aspects 22 through 26, further comprising: transmitting, via the control signaling, an indication of a set of codebooks comprising a first codebook corresponding to a first priority and a second codebook corresponding to a second priority, the first subset of uplink resources associated with the first CORESET pool and the first priority, the second subset of uplink resources associated with the second CORESET pool and the first priority, a third subset of uplink resources associated with the first CORESET pool and the second priority, a fourth subset of uplink resources associated with the second CORESET pool and the second priority, wherein receiving the one or more feedback transmissions is based at least in part on the set of codebooks.

Aspect 28: The method of any of aspects 22 through 27, further comprising: receiving the one or more feedback transmissions during a subsequent TTI and on one or more of a third uplink resource selected from the first subset of uplink resources or a fourth uplink resource selected from the second subset of uplink resources based at least in part on one or more of the first uplink resource or the second uplink resource overlapping with a downlink resource in a time domain during a current TTI.

Aspect 29: An apparatus for wireless communication at a UE, comprising at least one processor; memory coupled with the at least one processor; and instructions stored in the memory and executable by the processor to cause the apparatus to perform a method of any of aspects 1 through 21.

Aspect 30: An apparatus for wireless communication at a UE, comprising at least one means for performing a method of any of aspects 1 through 21.

Aspect 31: A non-transitory computer-readable medium storing code for wireless communication at a UE, the code comprising instructions executable by a processor to perform a method of any of aspects 1 through 21.

Aspect 32: An apparatus for wireless communication at a base station, comprising at least one processor; memory coupled with the at least one processor; and instructions stored in the memory and executable by the at least one processor to cause the apparatus to perform a method of any of aspects 22 through 28.

Aspect 33: An apparatus for wireless communication at a base station, comprising at least one means for performing a method of any of aspects 22 through 28.

Aspect 34: A non-transitory computer-readable medium storing code for wireless communication at a base station, the code comprising instructions executable by a processor to perform a method of any of aspects 22 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor; and
   memory coupled with the at least one processor, the memory storing instructions for the at least one processor to cause the UE to:
   receive control signaling indicating a configuration of a set of uplink resources, the set of uplink resources comprising a first subset of uplink resources associated with a first control resource set pool and a second subset of uplink resources associated with a second control resource set pool;

receive a set of semi-persistent scheduling downlink transmissions comprising a first downlink transmission associated with the first control resource set pool and a second downlink transmission associated with the second control resource set pool;

select a first uplink resource from the first subset of uplink resources and a second uplink resource from the second subset of uplink resources based at least in part on one or more of the first downlink transmission, the second downlink transmission, or a payload of a respective feedback transmission;

determine whether the first uplink resource from the first subset of uplink resources is overlapping with the second uplink resource from the second subset of uplink resources in a time domain based at least in part on the configuration of the set of uplink resources; and transmit one or more feedback transmissions on one or more of the first uplink resource or the second uplink resource based at least in part on the selecting, wherein the instructions to transmit the one or more feedback transmissions are further for the at least one processor to cause the UE to:

transmit, in response to the first downlink transmission, a first feedback transmission on the first uplink resource based at least in part on whether the first uplink resource is overlapping with the second uplink resource; and transmit, or refrain from transmitting, in response to the second downlink transmission, a second feedback transmission on the second uplink resource based at least in part on whether the second uplink resource is overlapping with the first uplink resource.

2. The apparatus of claim 1, wherein the instructions are further for the at least one processor to cause the UE to:
determine that the first uplink resource from the first subset of uplink resources is non-overlapping with the second uplink resource from the second subset of uplink resources in the time domain based at least in part on the configuration of the set of uplink resources, wherein the instructions to transmit the one or more feedback transmissions are further for the at least one processor to cause the UE to:
transmit, in response to the first downlink transmission, the first feedback transmission on the first uplink resource based at least in part on the first uplink resource non-overlapping with the second uplink resource; and
transmit, in response to the second downlink transmission, the second feedback transmission on the second uplink resource based at least in part on the second uplink resource non-overlapping with the first uplink resource.

3. The apparatus of claim 1, wherein the instructions to receive the control signaling are for the at least one processor to cause the UE to:
receive a radio resource control configuration, the configuration indicating that each uplink resource associated with the first subset of uplink resources is non-overlapping with each uplink resource associated with the second subset of uplink resources in the time domain, wherein the instructions to transmit the one or more feedback transmissions are further for the at least one processor based at least in part on that each uplink resource associated with the first subset of uplink resources is non-overlapping with each uplink resource associated with the second subset of uplink resources in the time domain.

4. The apparatus of claim 1, wherein the first uplink resource from the first subset of uplink resources and associated with the first downlink transmission is non-overlapping with a third uplink resource, the first uplink resource is different from the third uplink resource, the first uplink resource comprising a physical uplink control channel resource and the third uplink resource comprising a physical uplink shared channel resource associated with the second control resource set pool.

5. The apparatus of claim 1, wherein the instructions are further for the at least one processor to cause the UE to:
determine that the first uplink resource from the first subset of uplink resources is overlapping with the second uplink resource from the second subset of uplink resources in the time domain based at least in part on the configuration of the set of uplink resources, wherein the instructions to transmit the one or more feedback transmissions are further for the at least one processor to cause the UE to:
transmit, in response to the first downlink transmission, the first feedback transmission on the first uplink resource based at least in part on the first uplink resource overlapping with the second uplink resource; and
refrain from transmitting, in response to the second downlink transmission, the second feedback transmission on the second uplink resource based at least in part on the second uplink resource overlapping with the first uplink resource.

6. The apparatus of claim 5, wherein the instructions are further for the at least one processor to cause the UE to:
determine a first priority of the first feedback transmission based at least in part on the first downlink transmission associated with the first control resource set pool and a second priority of the second feedback transmission based at least in part on the second downlink transmission associated with the second control resource set pool,
wherein the instructions to transmit the first feedback transmission and refraining from transmitting the second feedback transmission are further for the at least one processor based at least in part on the first priority being higher than the second priority.

7. The apparatus of claim 1, wherein the instructions are further for the at least one processor to cause the UE to:
determine a set of codebooks based at least in part on the control signaling, the set of codebooks comprising a first codebook corresponding to a first priority and a second codebook corresponding to a second priority, the first subset of uplink resources associated with the first control resource set pool and the first priority, the second subset of uplink resources associated with the second control resource set pool and the first priority, a third subset of uplink resources associated with the first control resource set pool and the second priority, a fourth subset of uplink resources associated with the second control resource set pool and the second priority, wherein the instructions to transmit the one or more feedback transmissions are further for the at least one processor based at least in part on the set of codebooks.

8. The apparatus of claim 1, wherein the instructions are further for the at least one processor to cause the UE to:
determine a subsequent transmission time interval for transmitting the one or more feedback transmissions based at least in part on one or more of the first uplink resource or the second uplink resource overlapping with a downlink resource in the time domain during a current transmission time interval, wherein the instructions to transmit the one or more feedback transmissions are further for the at least one processor to cause the UE to:
transmit the one or more feedback transmissions based at least in part on determining the subsequent transmission time interval for transmitting the one or more feedback transmissions.

9. The apparatus of claim 8, wherein the instructions are further for the at least one processor to cause the UE to:
select one or more of a third uplink resource from the first subset of uplink resources or a fourth uplink resource from the second subset of uplink resources based at least in part on a payload size of the one or more feedback transmissions and the first uplink resource or the second uplink resource overlapping with the downlink resource, wherein the instructions to transmit the one or more feedback transmissions are further for the at least one processor to cause the UE to:
transmit the one or more feedback transmissions during the subsequent transmission time interval and on one or more of the third uplink resource or the fourth uplink resource.

10. The apparatus of claim 8, wherein the instructions are further for the at least one processor to cause the UE to:
jointly determine the subsequent transmission time interval for transmitting the one or more feedback transmissions based at least in part on a criterion and irrespective of one or more of the first control resource set pool or the second control resource set pool, the criterion comprising that the subsequent transmission time interval comprises an uplink resource, the uplink resource including an uplink symbol.

11. The apparatus of claim 8, wherein the instructions are further for the at least one processor to cause the UE to:
refrain from transmitting the one or more feedback transmissions during the subsequent transmission time interval based at least in part on one or more of a third uplink resource from the first subset of uplink resources or a fourth uplink resource from the second subset of uplink resources overlapping with a second downlink resource in the time domain during the subsequent transmission time interval,
wherein the instructions to refrain from transmitting the one or more feedback transmissions occurs separately for a first feedback transmission associated with the first control resource set pool and a second feedback transmission associated with the second control resource set pool are further for the at least one processor based at least in part on one or more of the third uplink resource from the first subset of uplink resources or the fourth uplink resource from the second subset of uplink resources overlapping with the second downlink resource in the time domain during the subsequent transmission time interval.

12. The apparatus of claim 8, wherein the instructions are further for the at least one processor to cause the UE to:
determine a subsequent transmission time interval for each of the one or more feedback transmissions based at least in part on one or more of the first uplink resource or the second uplink resource overlapping with a downlink resource in the time domain during the current transmission time interval; and
determine that the subsequent transmission time interval for each of the one or more feedback transmissions is the same, wherein the instructions to transmit the one or more feedback transmissions are further for the at least one processor to cause the UE to:
transmit the one or more feedback transmissions during the subsequent transmission time interval based at least in part on time division multiplexing the subsequent transmission time interval for each of the one or more feedback transmissions.

13. The apparatus of claim 8, wherein the instructions are further for the at least one processor to cause the UE to:
determine the subsequent transmission time interval for transmitting the one or more feedback transmissions based at least in part on one or more of the first control resource set pool, the second control resource set pool, a codebook associated with the one or more feedback transmissions, or an uplink resource associated with the one or more feedback transmissions non-overlapping with a downlink resource associated with the subsequent transmission time interval.

14. The apparatus of claim 1, wherein the instructions are further for the at least one processor to cause the UE to:
determine a first subsequent transmission time interval for transmitting the first feedback transmission associated with the one or more feedback transmissions based at least in part on one or more of the first control resource set pool, or the first uplink resource overlapping with a downlink resource in the time domain during a current transmission time interval; and
select a third uplink resource from the first subset of uplink resources based at least in part on a payload size of the first feedback transmission and the first uplink resource overlapping with the downlink resource, wherein the instructions to transmit the one or more feedback transmissions are further for the at least one processor to cause the UE to:
transmit the first feedback transmission on the third uplink resource during the first subsequent transmission time interval.

15. The apparatus of claim 14, wherein the instructions are further for the at least one processor to cause the UE to:
determine the first subsequent transmission time interval for transmitting the second feedback transmission associated with the one or more feedback transmissions based at least in part on one or more of the second control resource set pool, or the second uplink resource overlapping with the downlink resource in the time domain during the current transmission time interval; and
select a fourth uplink resource from the second subset of uplink resources based at least in part on a payload size of the second feedback transmission and the second uplink resource overlapping with the downlink resource.

16. The apparatus of claim 15, wherein the instructions to transmit the one or more feedback transmissions are for the at least one processor to cause the UE to:
transmit the second feedback transmission on the fourth uplink resource during the first subsequent transmission time interval based at least in part on the fourth uplink resource non-overlapping with the third uplink resource.

17. The apparatus of claim 15, wherein the instructions are further for the at least one processor to cause the UE to:
   determine that the fourth uplink resource is overlapping with the third uplink resource during the first subsequent transmission time interval; and
   refrain from transmitting the second feedback transmission on the fourth uplink resource during the first subsequent transmission time interval based at least in part on the fourth uplink resource overlapping with the third uplink resource.

18. The apparatus of claim 17, wherein the instructions are further for the at least one processor to cause the UE to:
   determine a second subsequent transmission time interval for transmitting the second feedback transmission associated with the one or more feedback transmissions based at least in part on the fourth uplink resource overlapping with the third uplink resource during the first subsequent transmission time interval, wherein the instructions to transmit the one or more feedback transmissions are further for the at least one processor to cause the UE to:
   transmit the second feedback transmission during the second subsequent transmission time interval.

19. The apparatus of claim 1, wherein the first subset of uplink resources and the second subset of uplink resources correspond to separate feedback transmissions.

20. The apparatus of claim 1, wherein the instructions are further for the at least one processor to cause the UE to:
   receive a downlink control information message on a control resource set; and
   determine that the control resource set corresponds to one or more of the first control resource set pool or the second control resource set pool,
   wherein the instructions to receive the set of semi-persistent scheduling downlink transmissions comprising the first downlink transmission associated with the first control resource set pool and the second downlink transmission associated with the second control resource set pool are further for the at least one processor based at least in part on the determining that the control resource set corresponds to one or more of the first control resource set pool or the second control resource set pool.

21. The apparatus of claim 1, wherein the control signaling comprises radio resource control signaling and the configuration comprises a semi-persistent scheduling configuration associated with the set of semi-persistent scheduling downlink transmissions comprising the first downlink transmission associated with the first control resource set pool and the second downlink transmission associated with the second control resource set pool.

22. An apparatus for wireless communication at a network device, comprising:
   at least one processor; and
   memory coupled with the at least one processor, the memory storing instructions for the at least one processor to cause the network device to:
      transmit control signaling indicating a configuration of a set of uplink resources, the set of uplink resources comprising a first subset of uplink resources associated with a first control resource set pool and a second subset of uplink resources associated with a second control resource set pool;
      transmit a set of semi-persistent scheduling downlink transmissions comprising a first downlink transmission associated with the first control resource set pool and a second downlink transmission associated with the second control resource set pool; and
      receive one or more feedback transmissions on one or more of a first uplink resource or a second uplink resource based at least in part on one or more of the first downlink transmission or the second downlink transmission, wherein the first uplink resource is associated with the first subset of uplink resources and the second uplink resource is associated with the second subset of uplink resources, and wherein the instruction to receive the one or more feedback transmissions are further for the at least one processor to cause the network device to:
         receive, based at least in part on the first downlink transmission, a first feedback transmission on the first uplink resource based at least in part on whether the first uplink resource is overlapping with the second uplink resource; and
         receive, based at least in part on the second transmission, a second feedback transmission on the second uplink resource based at least in part on whether the second uplink resource is overlapping with the first uplink resource.

23. A method for wireless communication at a user equipment (UE), comprising:
   receiving control signaling indicating a configuration of a set of uplink resources, the set of uplink resources comprising a first subset of uplink resources associated with a first control resource set pool and a second subset of uplink resources associated with a second control resource set pool;
   receiving a set of semi-persistent scheduling downlink transmissions comprising a first downlink transmission associated with the first control resource set pool and a second downlink transmission associated with the second control resource set pool;
   selecting a first uplink resource from the first subset of uplink resources and a second uplink resource from the second subset of uplink resources based at least in part on one or more of the first downlink transmission, the second downlink transmission, or a payload of a respective feedback transmission;
   determining whether the first uplink resource from the first subset of uplink resources is overlapping with the second uplink resource from the second subset of uplink resources in a time domain based at least in part on the configuration of the set of uplink resources; and
   transmitting one or more feedback transmissions on one or more of the first uplink resource or the second uplink resource based at least in part on the selecting, wherein transmitting the one or more feedback transmissions comprises:
      transmitting, in response to the first downlink transmission, a first feedback transmission on the first uplink resource based at least in part on whether the first uplink resource is overlapping with the second uplink resource; and
      transmitting, or refraining from transmitting, in response to the second downlink transmission, a second feedback transmission on the second uplink resource based at least in part on whether the second uplink resource is overlapping with the first uplink resource.

24. The method of claim 23, further comprising:
determining that the first uplink resource from the first subset of uplink resources is non-overlapping with the second uplink resource from the second subset of uplink resources in the time domain based at least in part on the configuration of the set of uplink resources, wherein transmitting the one or more feedback transmissions comprises:
transmitting, in response to the first downlink transmission, the first feedback transmission on the first uplink resource based at least in part on the first uplink resource non-overlapping with the second uplink resource; and
transmitting, in response to the second downlink transmission, the second feedback transmission on the second uplink resource based at least in part on the second uplink resource non-overlapping with the first uplink resource.

25. The method of claim 23, wherein receiving the control signaling comprises:
receiving a radio resource control configuration, the configuration indicating that each uplink resource associated with the first subset of uplink resources is non-overlapping with each uplink resource associated with the second subset of uplink resources in the time domain,
wherein transmitting the one or more feedback transmissions is based at least in part on that each uplink resource associated with the first subset of uplink resources is non-overlapping with each uplink resource associated with the second subset of uplink resources in the time domain.

26. The method of claim 23, wherein the first uplink resource from the first subset of uplink resources and associated with the first downlink transmission is non-overlapping with a third uplink resource, the first uplink resource is different from the third uplink resource, the first uplink resource comprising a physical uplink control channel resource and the third uplink resource comprising a physical uplink shared channel resource associated with the second control resource set pool.

27. The method of claim 23, further comprising:
determining that the first uplink resource from the first subset of uplink resources is overlapping with the second uplink resource from the second subset of uplink resources in the time domain based at least in part on the configuration of the set of uplink resources, wherein transmitting the one or more feedback transmissions comprises:
transmitting, in response to the first downlink transmission, the first feedback transmission on the first uplink resource based at least in part on the first uplink resource overlapping with the second uplink resource; and
refraining from transmitting, in response to the second downlink transmission, the second feedback transmission on the second uplink resource based at least in part on the second uplink resource overlapping with the first uplink resource.

28. The method of claim 27, further comprising:
determining a first priority of the first feedback transmission based at least in part on the first downlink transmission associated with the first control resource set pool and a second priority of the second feedback transmission based at least in part on the second downlink transmission associated with the second control resource set pool,
wherein transmitting the first feedback transmission and refraining from transmitting the second feedback transmission is based at least in part on the first priority being higher than the second priority.

29. The method of claim 23, further comprising:
determining a set of codebooks based at least in part on the control signaling, the set of codebooks comprising a first codebook corresponding to a first priority and a second codebook corresponding to a second priority, the first subset of uplink resources associated with the first control resource set pool and the first priority, the second subset of uplink resources associated with the second control resource set pool and the first priority, a third subset of uplink resources associated with the first control resource set pool and the second priority, a fourth subset of uplink resources associated with the second control resource set pool and the second priority,
wherein transmitting the one or more feedback transmissions is based at least in part on the set of codebooks.

30. A method for wireless communication at a network device, comprising:
transmitting control signaling indicating a configuration of a set of uplink resources, the set of uplink resources comprising a first subset of uplink resources associated with a first control resource set pool and a second subset of uplink resources associated with a second control resource set pool;
transmitting a set of semi-persistent scheduling downlink transmissions comprising a first downlink transmission associated with the first control resource set pool and a second downlink transmission associated with the second control resource set pool; and
receiving one or more feedback transmissions on one or more of a first uplink resource or a second uplink resource based at least in part on one or more of the first downlink transmission or the second downlink transmission, wherein the first uplink resource is associated with the first subset of uplink resources and the second uplink resource is associated with the second subset of uplink resources, and wherein receiving the one or more feedback transmissions comprises:
receiving, based at least in part on the first downlink transmission, a first feedback transmission on the first uplink resource based at least in part on whether the first uplink resource is overlapping with the second uplink resource; and
receiving, based at least in part on the second transmission, a second feedback transmission on the second uplink resource based at least in part on whether the second uplink resource is overlapping with the first uplink resource.

* * * * *